United States Patent
Paine et al.

(10) Patent No.: US 9,846,535 B2
(45) Date of Patent: Dec. 19, 2017

(54) DEVICES AND METHODS FOR PROCESSING TOUCH INPUTS OVER MULTIPLE REGIONS OF A TOUCH-SENSITIVE SURFACE

(71) Applicant: Apple Inc., Cupertino, CA (US)

(72) Inventors: Brittany D. Paine, San Jose, CA (US); Jonathan E. Drummond, Sunnyvale, CA (US); Benjamin E. Nielsen, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 247 days.

(21) Appl. No.: 14/866,231

(22) Filed: Sep. 25, 2015

(65) Prior Publication Data

US 2016/0357388 A1    Dec. 8, 2016

Related U.S. Application Data

(60) Provisional application No. 62/172,003, filed on Jun. 5, 2015.

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 3/0416* (2013.01); *G06F 3/0418* (2013.01);
(Continued)

(58) Field of Classification Search
CPC .................................................... G06F 3/0488
(Continued)

(56) References Cited

U.S. PATENT DOCUMENTS

2012/0299968 A1    11/2012  Wong et al.
2013/0067391 A1*   3/2013  Pittappilly ............ G06F 3/0488
                                                       715/784

(Continued)

FOREIGN PATENT DOCUMENTS

EP         1 457 864 A1      9/2004
GB         2487425 A         7/2012
WO         WO 2006/073272 A1 7/2006

OTHER PUBLICATIONS

International Search Report and Written Opinion, dated Aug. 4, 2016, received in International Patent Application No. PCT/US2016/033530, which corresponds with U.S. Appl. No. 14/866,231, 15 pages.

*Primary Examiner* — William Titcomb
(74) *Attorney, Agent, or Firm* — Morgan, Lewis & Bockius LLP

(57) ABSTRACT

An electronic device, while displaying a user interface that includes a first region corresponding to a first software application and a second region corresponding to a second software application, receives a first touch input, on a touch-sensitive display, that originates from a first location corresponding to the first region and extends to a second location corresponding to the second region. The first region includes a non-boundary region and a boundary region. In response to receiving the first touch input, when the first location corresponds to a non-boundary region of the first region, the device processes the first touch input with the first software application. When the first location corresponds to a boundary region of the first region, the device conditionally processes the first touch input with the second software application.

42 Claims, 38 Drawing Sheets

(51) Int. Cl.
*G06F 9/44* (2006.01)
*G06F 3/041* (2006.01)
*G06F 3/0481* (2013.01)

(52) U.S. Cl.
CPC ........ *G06F 3/0481* (2013.01); *G06F 3/04883* (2013.01); *G06F 3/04886* (2013.01); *G06F 9/4443* (2013.01); *G06F 2203/04803* (2013.01)

(58) Field of Classification Search
USPC ........................................................ 715/781
See application file for complete search history.

(56) References Cited

U.S. PATENT DOCUMENTS

| | | | | |
|---|---|---|---|---|
| 2013/0239015 | A1* | 9/2013 | Forest | A61F 4/00 715/752 |
| 2014/0164991 | A1* | 6/2014 | Kim | G06F 3/0481 715/794 |
| 2014/0195953 | A1 | 7/2014 | Sakai et al. | |
| 2014/0298247 | A1* | 10/2014 | Cho | G06F 3/0488 715/781 |
| 2016/0202852 | A1* | 7/2016 | Park | G06F 3/0488 715/781 |

* cited by examiner

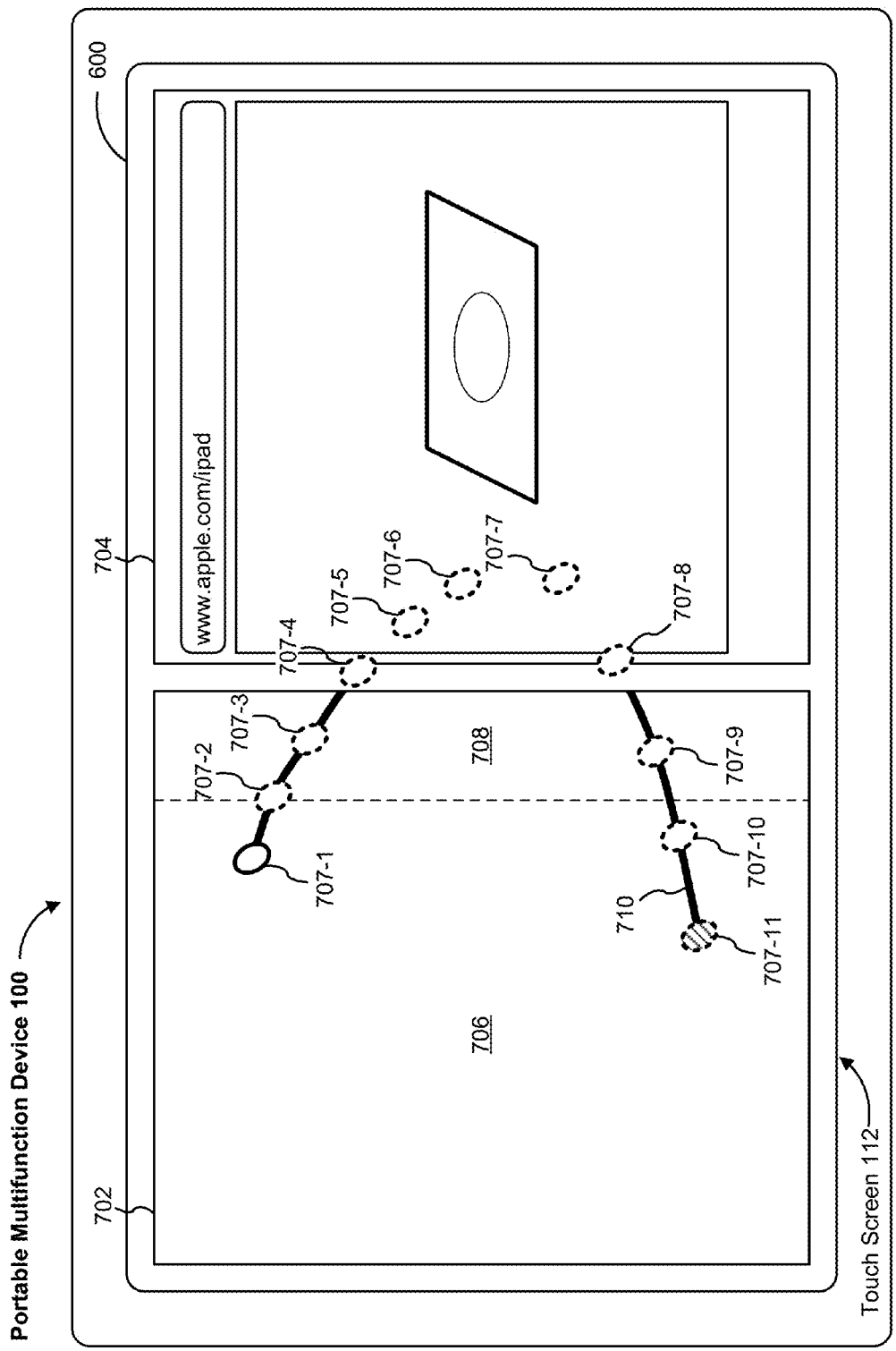

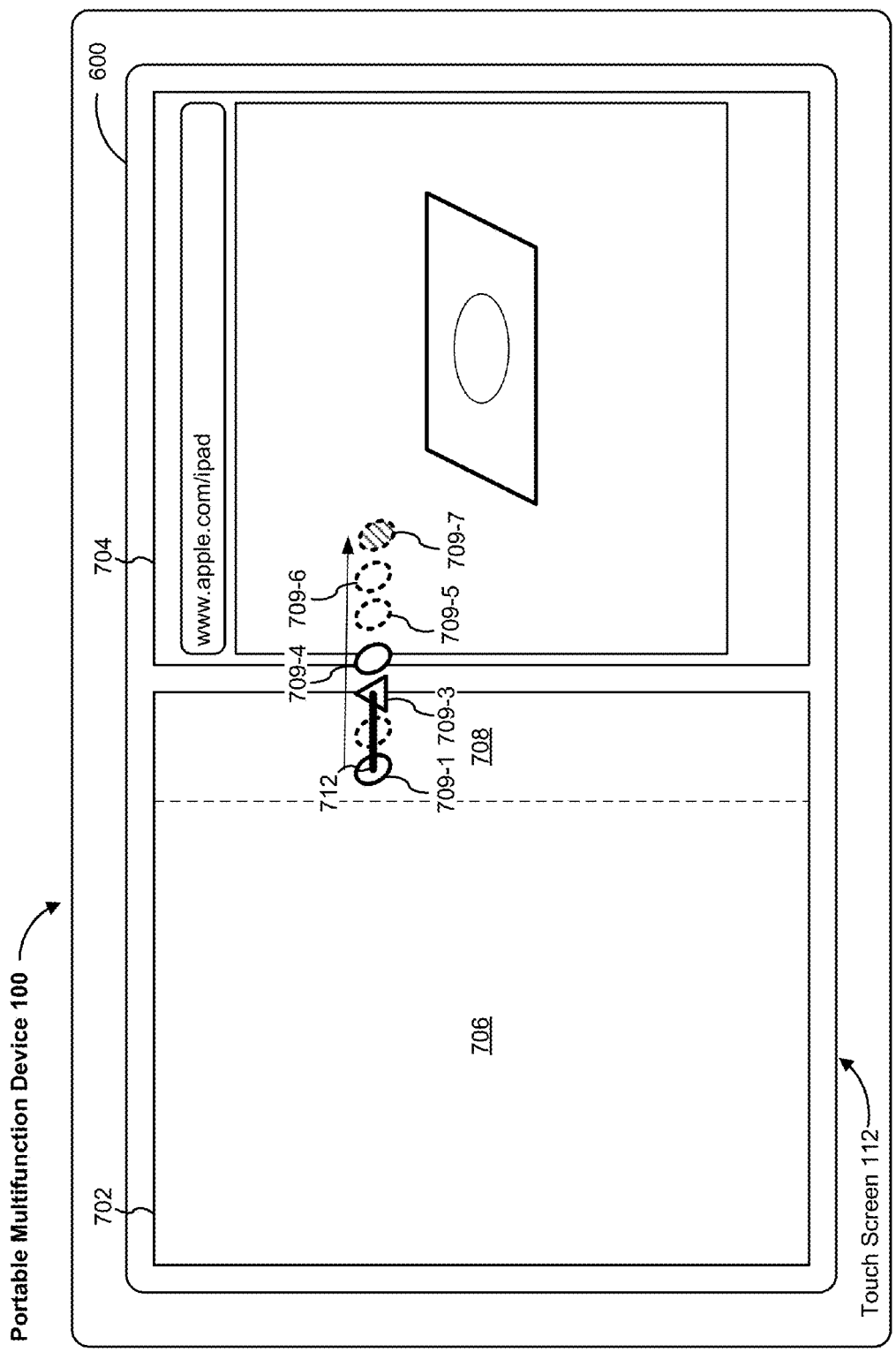

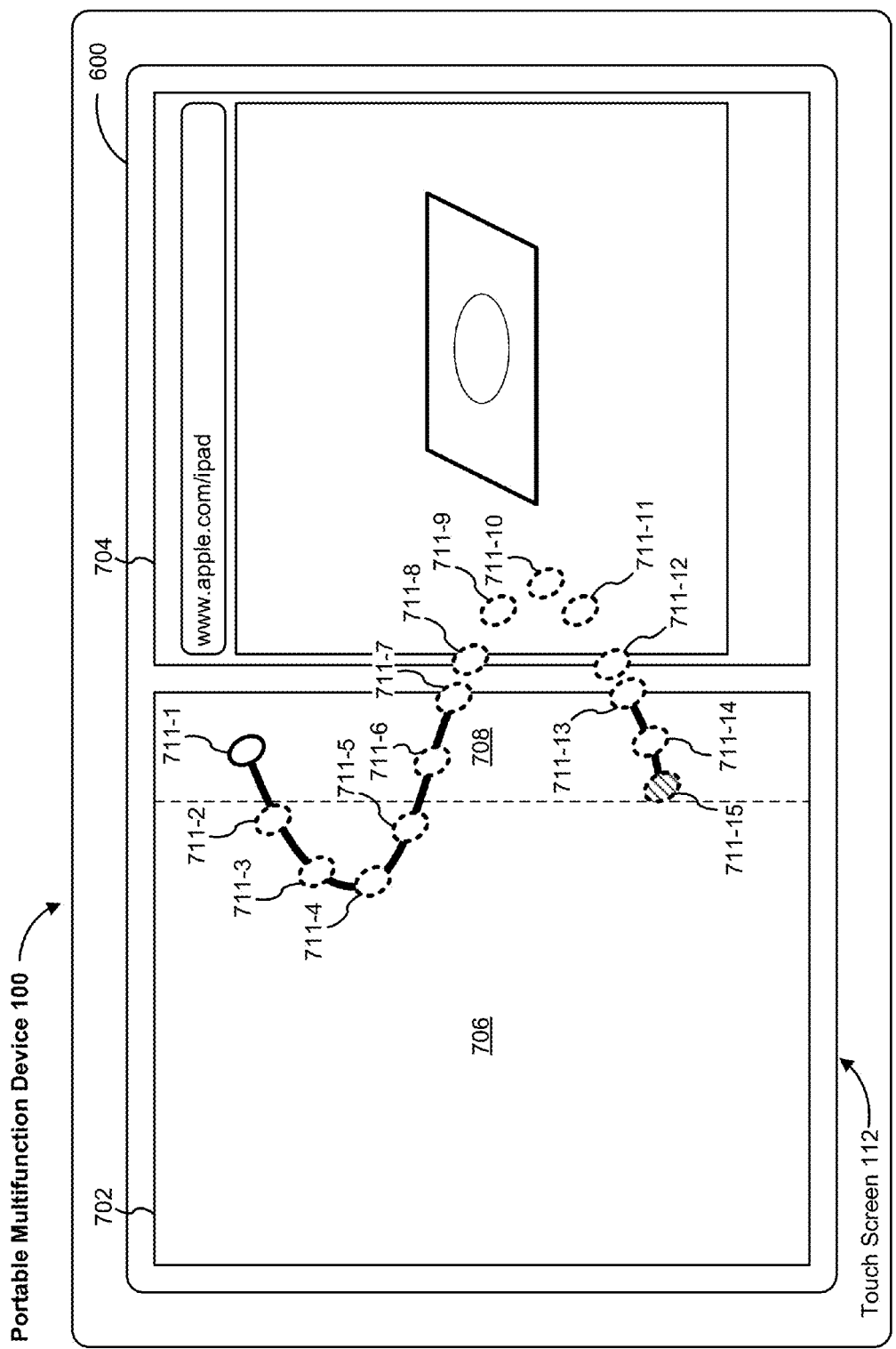

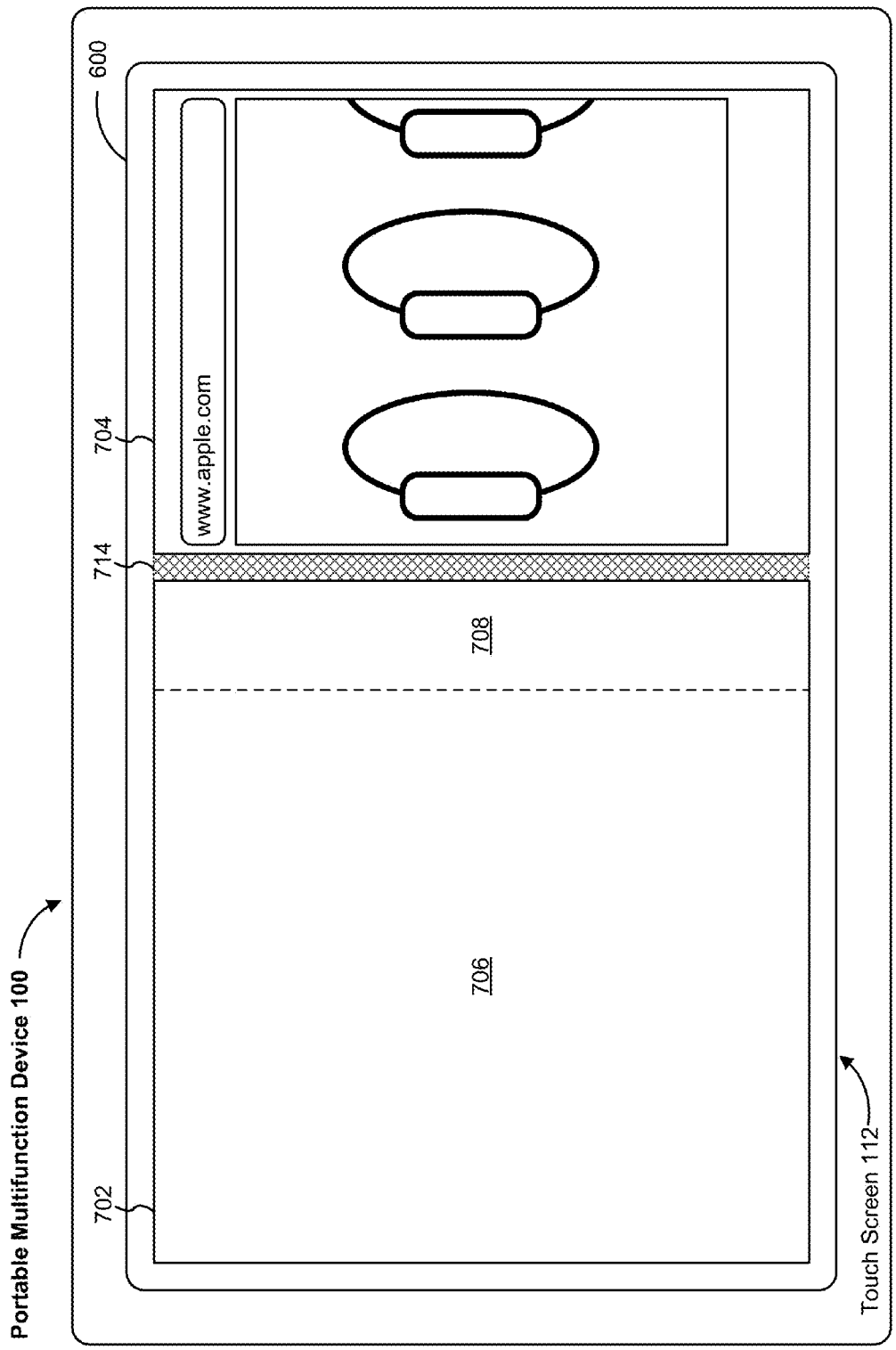

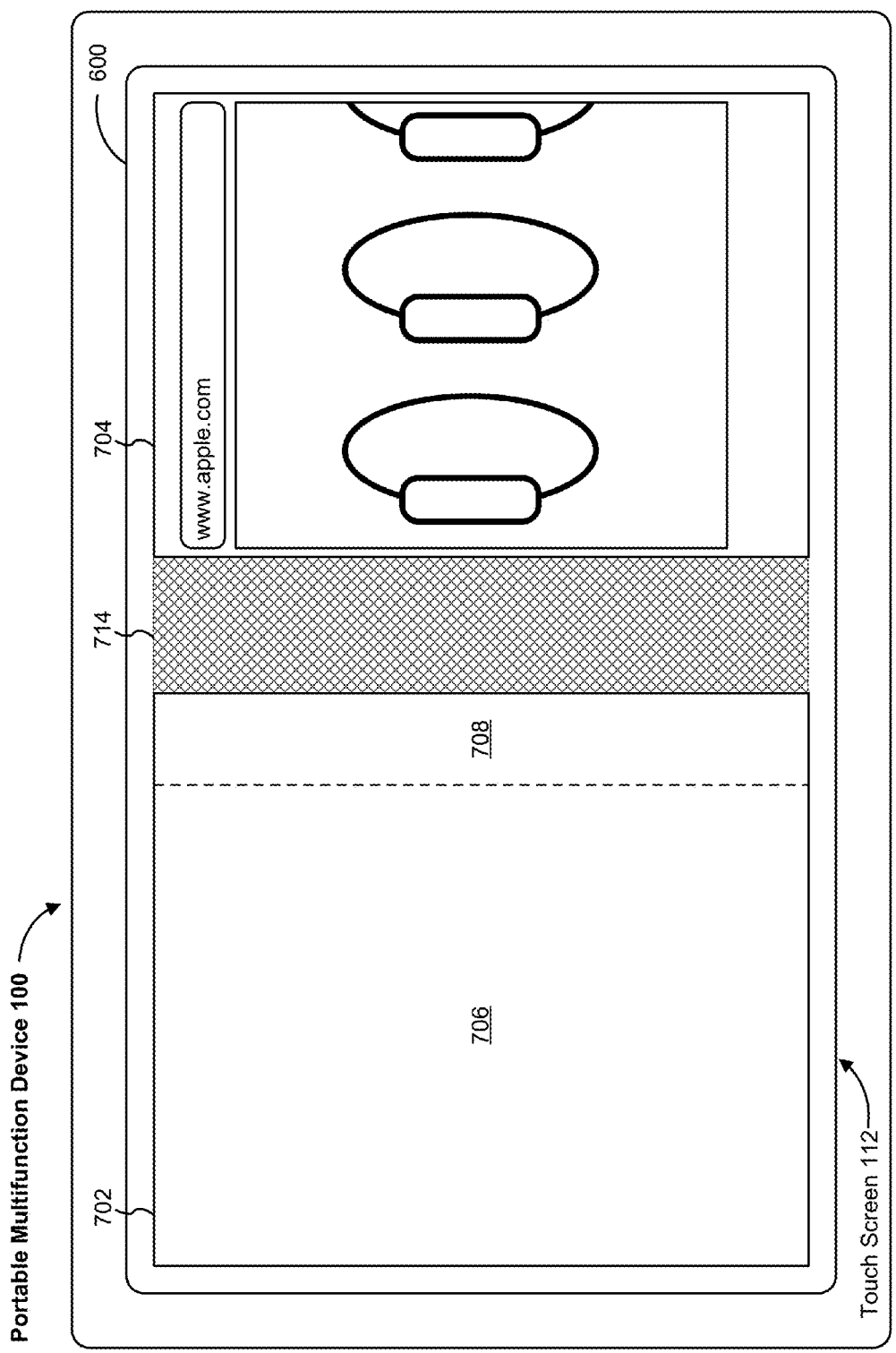

800

802 While displaying a user interface that includes a first region that corresponds to a first software application and a second region that corresponds to a second software application that is distinct from the first software application

804 Receive a first touch input, on the touch-sensitive display, that originates from a first location on the touch-sensitive display that corresponds to the first region of the user interface and extends to a second location on the touch-sensitive display that corresponds to the second region of the user interface In response to receiving the first touch input:

806 In accordance with a determination that the first location corresponds to a non-boundary region of the first region, process the first touch input with the first software application. The non-boundary region of the first region is included in the first region and located away from the second region in the user interface.

In accordance with a determination that the first location corresponds to a boundary region of the first region:

808 Conditionally process the first touch input with the second software application. The boundary region of the first region is included in the first region and located between the non-boundary portion of the first region and the second region in the user interface.

810 The first touch input has not entered the non-boundary region of the first region on the touch-sensitive display. Process the first touch input with the second software application.

812 The first touch input has entered the non-boundary region of the first region on the touch-sensitive display. Process the first touch input with the first software application.

DEVICES AND METHODS FOR PROCESSING TOUCH INPUTS OVER MULTIPLE REGIONS OF A TOUCH-SENSITIVE SURFACE

RELATED APPLICATION

This application claims priority to U.S. Provisional Patent Application Ser. No. 62/172,003, filed Jun. 5, 2015, entitled "Devices and Methods for Processing Touch Inputs over Multiple Regions of a Touch-Sensitive Surface," which is incorporated by reference herein in its entirety.

TECHNICAL FIELD

This relates generally to electronic devices with touch-sensitive surfaces, including but not limited to electronic devices with touch-sensitive surfaces that include multiple regions.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for processing touch inputs that contact user interfaces of multiple applications are cumbersome and inefficient. For example, for a touch input that moves from a first application user interface to a second application user interface, processing a portion of the touch input with the first application and a portion of the touch input with the second application can confuse a user and create a significant cognitive burden on the user. In addition, if unintended operations are performed, the user needs to provide additional inputs to undo such operations. Thus, these methods take longer than necessary, thereby wasting energy. This latter consideration is particularly important in battery-operated devices.

SUMMARY

Accordingly, the described embodiments provide electronic devices with faster, more efficient methods and interfaces for processing touch inputs that move over multiple application user interfaces. Such methods and interfaces optionally complement or replace conventional methods for processing touch inputs that move over multiple application user interfaces. Such methods and interfaces reduce the number, extent, and/or nature of the inputs from a user and produce a more efficient human-machine interface. Further, such methods reduce the processing power consumed to process touch inputs, conserve power, reduce unnecessary/extraneous/repetitive inputs, and potentially reduce memory usage. For battery-operated devices, such methods and interfaces conserve battery power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors.

In accordance with some embodiments, a method is performed at an electronic device with a touch-sensitive display. The method includes, while displaying a user interface that includes a first region that corresponds to a first software application and a second region that corresponds to a second software application that is distinct from the first software application, receiving a first touch input, on the touch-sensitive display, that originates from a first location on the touch-sensitive display that corresponds to the first region of the user interface and extends to a second location on the touch-sensitive display that corresponds to the second region of the user interface. The method includes, in response to receiving the first touch input, in accordance with a determination that the first location corresponds to a non-boundary region of the first region, processing the first touch input with the first software application, where the non-boundary region of the first region is included in the first region and located away from the second region in the user interface, and in accordance with a determination that the first location corresponds to a boundary region of the first region, conditionally processing the first touch input with the second software application, where the boundary region of the first region is included in the first region and located between the non-boundary portion of the first region and the second region in the user interface.

In accordance with some embodiments, an electronic device includes a touch-sensitive display unit configured to display a user interface and receive contacts; and a processing unit coupled with the touch-sensitive display unit. The processing unit is configured to: while enabling display of a user interface that includes a first region that corresponds to a first software application and a second region that corresponds to a second software application that is distinct from the first software application, receive a first touch input, from the touch-sensitive display unit, that originates from a first location on the touch-sensitive display unit that corresponds to the first region of the user interface and extends to a second location on the touch-sensitive display unit that corresponds to the second region of the user interface. The processing unit is further configured to: in response to receiving the first touch input, in accordance with a determination that the first location corresponds to a non-boundary region of the first region, process the first touch input with the first software application, where the non-boundary region of the first region is included in the first region and located away from the second region in the user interface, and in accordance with a determination that the first location corresponds to a boundary region of the first region, conditionally process the first touch input with the second software application, where the boundary region of the first region is included in the first region and located between the non-boundary portion of the first region and the second region in the user interface.

In accordance with some embodiments, an electronic device includes a touch-sensitive display, one or more processors, memory, and one or more programs; the one or more programs are stored in the memory and configured to be executed by the one or more processors and the one or more programs include instructions for performing or causing performance of the operations of any of the methods described herein. In some embodiments, the electronic device includes one or more sensors to detect intensity of contacts with the touch-sensitive surface. In some embodiments, the electronic device includes one or more sensors to detect signals from a stylus associated with the electronic device. In accordance with some embodiments, a computer readable storage medium (e.g., a non-transitory computer readable storage medium, or alternatively, a transitory computer readable storage medium) has stored therein instructions, which, when executed by an electronic device with a touch-sensitive display, cause the device to perform or cause performance of the operations of any of the methods described herein. In accordance with some embodiments, a graphical user interface on an electronic device with a touch-sensitive display, a memory, and one or more processors to execute one or more programs stored in the memory includes one or more of the elements displayed in any of the methods described above, which are updated in response to inputs, as described in any of the methods described herein. In accordance with some embodiments, an electronic device includes: a touch-sensitive display, and means for performing or causing performance of the operations of any of the methods described herein. In accordance with some embodiments, an information processing apparatus, for use in an electronic device with a touch-sensitive display, includes means for performing or causing performance of the operations of any of the methods described herein.

Thus, electronic devices with touch-sensitive displays are provided with faster, more efficient methods and interfaces for processing touch inputs that move over multiple application user interfaces, thereby increasing the effectiveness, efficiency, and user satisfaction with such devices. Such methods and interfaces may complement or replace conventional methods for processing touch inputs that move over multiple application user interfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8D are flow diagrams illustrating a method of processing a touch input that moves over multiple application user interfaces in accordance with some embodiments.

DESCRIPTION OF EMBODIMENTS

Figure 1A:
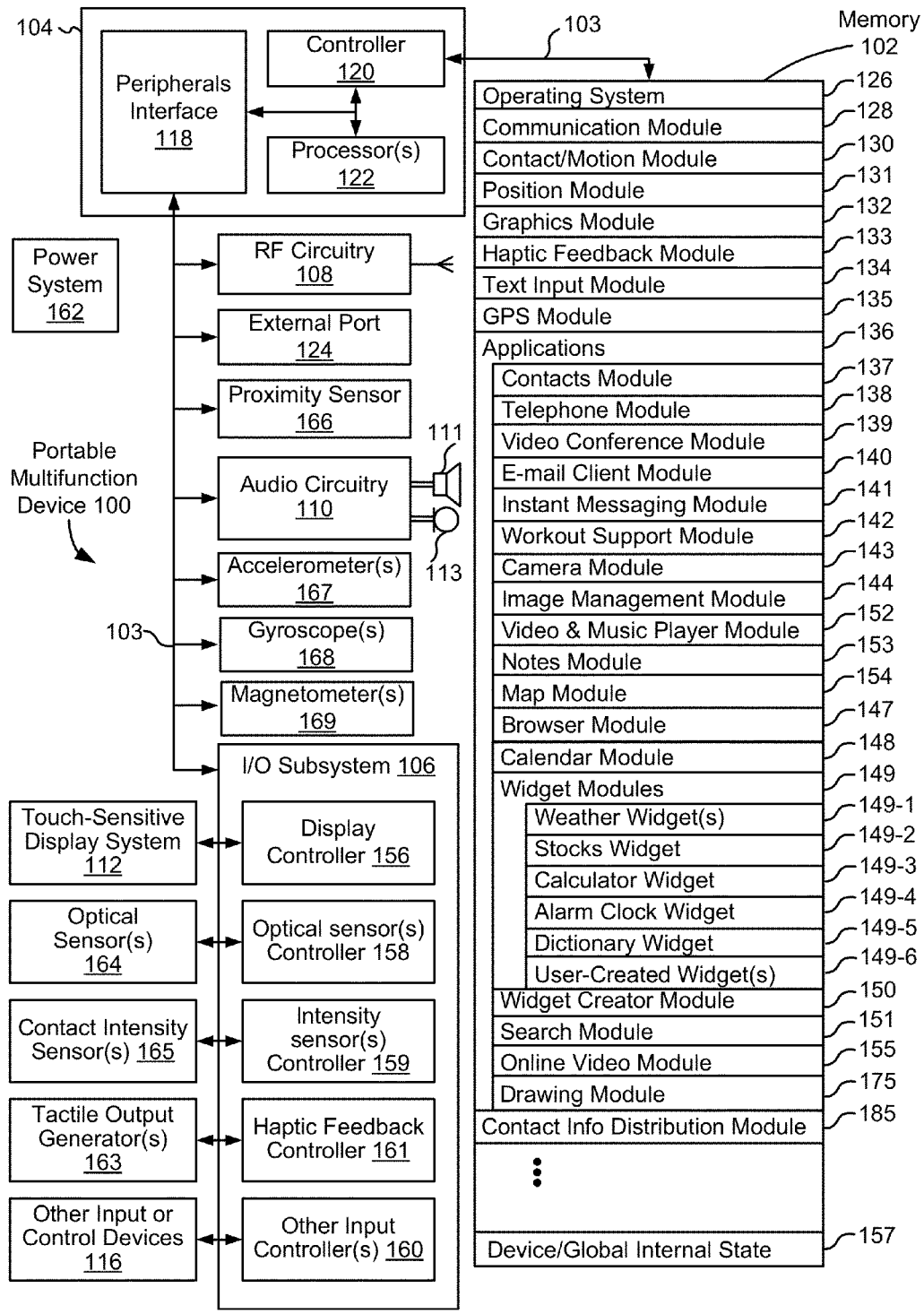
FIG. 1A is a block diagram illustrating a portable multifunction device with a touch-sensitive display in accordance with some embodiments.

Many electronic devices have graphical user interfaces that are capable of concurrently displaying user interfaces of multiple software applications. When two application user interfaces are displayed adjacent to each other, a user may contact a first application user interface when the user intended to contact the second application user interface, and contact the second application user interface when the user intended to contact the first application user interface. For example, when a user is drawing on a drawing application user interface close to a border of the drawing application user interface with a touch input (e.g., a finger input or a stylus input), the user may overshoot and cause the touch input to leave the drawing application user interface. It can be frustrating for the user if the overshooting causes unintended operations, such as changes to the adjacent application user interface (e.g., a web browser application) and/or undoing strokes drawn in the drawing application user interface. In another example, when a user wants to provide a touch input (e.g., an edge swipe gesture) to the web browser application, the use may unintentionally contact the drawing application user interface first, thereby leaving a stroke in the drawing application user interface. Such unintended operations require undoing such unintended operations and providing again user inputs until desired operations are performed, which can be cumbersome and inefficient.

In the embodiments described below, an improved method for processing a touch input is achieved by receiving a touch input that moves from one application user interface (e.g., the drawing application user interface) to another application user interface (e.g., the web browser application user interface). The touch input is processed differently based on whether the touch input originates from a non-boundary region or a boundary region of the one application user interface. This method reduces unintended operations, thereby eliminating the need for extra, separate steps to undo unintended operations and provide user inputs until desired operations are performed.

Figure 2:
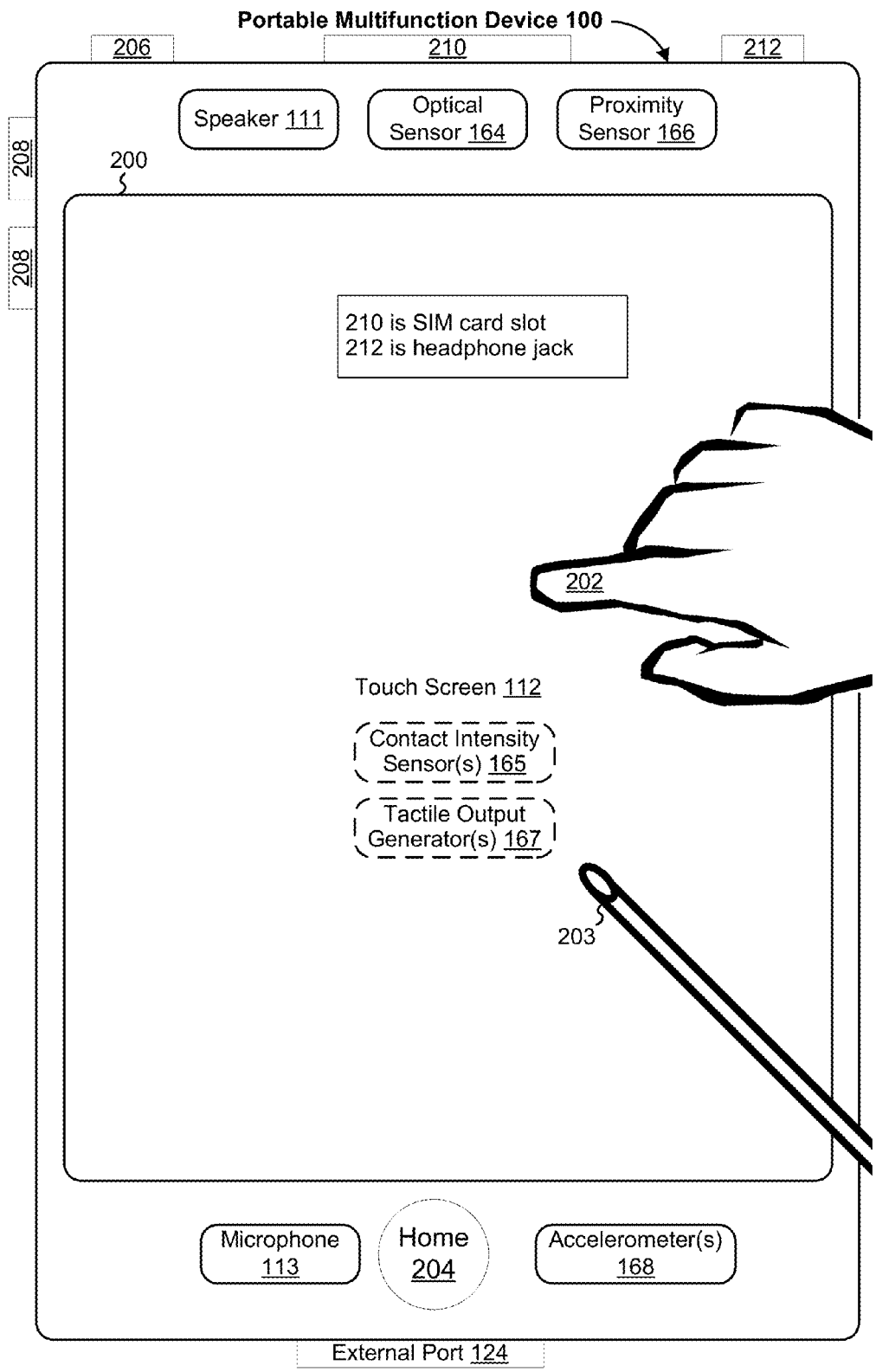
FIG. 2 illustrates a portable multifunction device having a touch screen in accordance with some embodiments.
Figure 3:
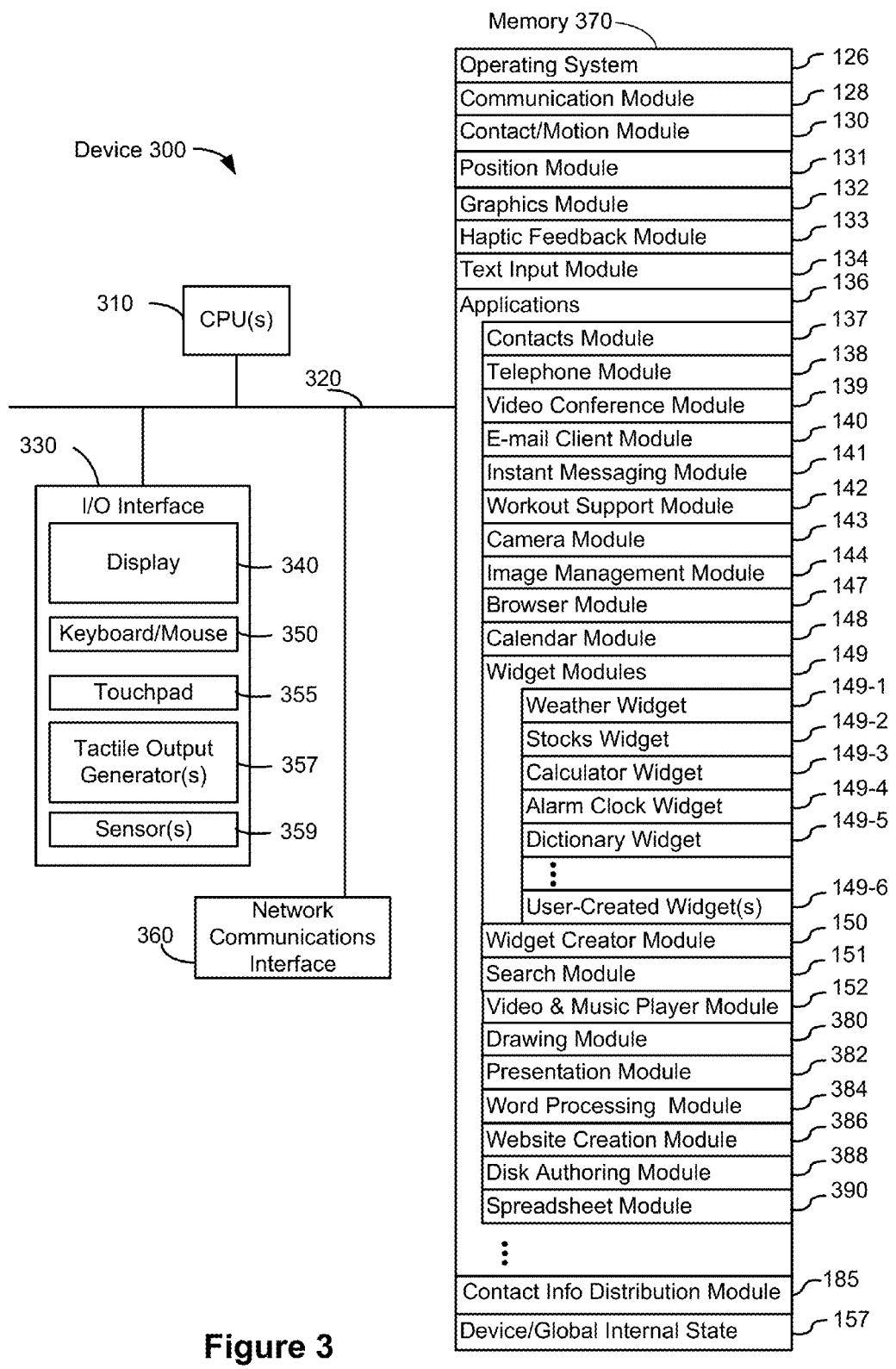
FIG. 3 is a block diagram of an exemplary multifunction device with a display and a touch-sensitive surface in accordance with some embodiments.
Figure 4:
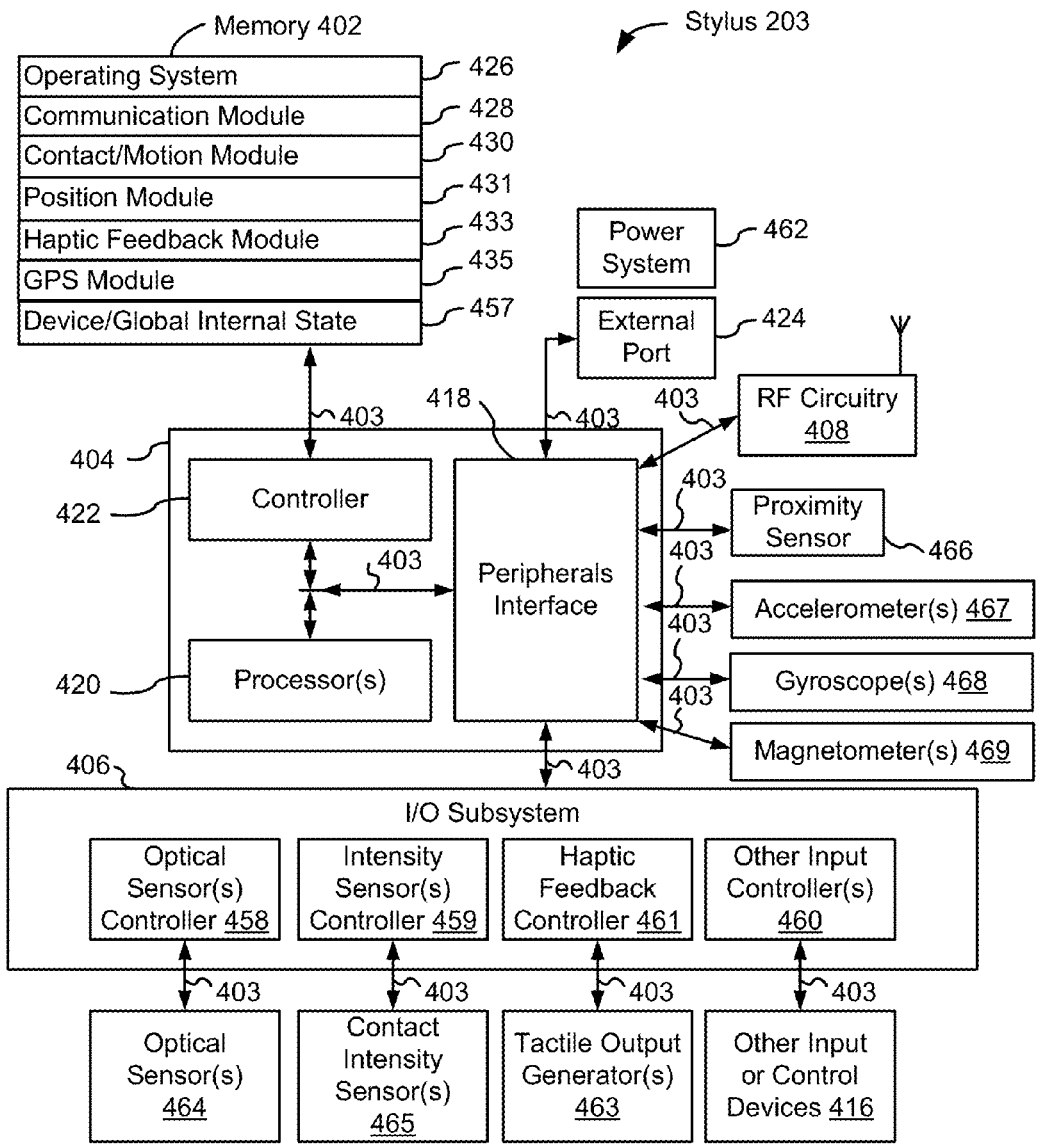
FIG. 4 is a block diagram of an exemplary electronic stylus in accordance with some embodiments.
Figure 5A:
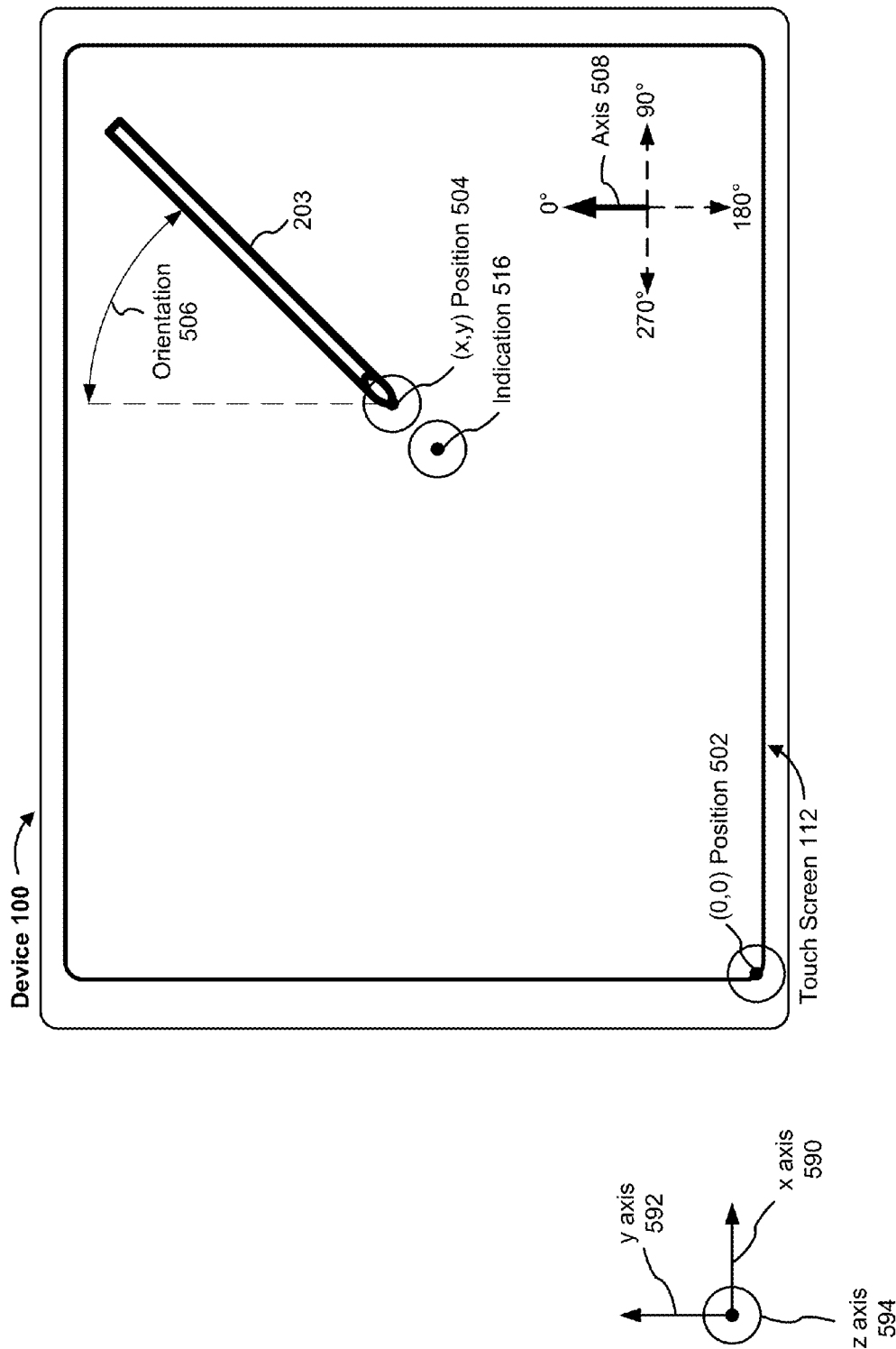
FIGS. 5A-5B illustrate a positional state of a stylus relative to a touch-sensitive surface in accordance with some embodiments.
Figure 5B:
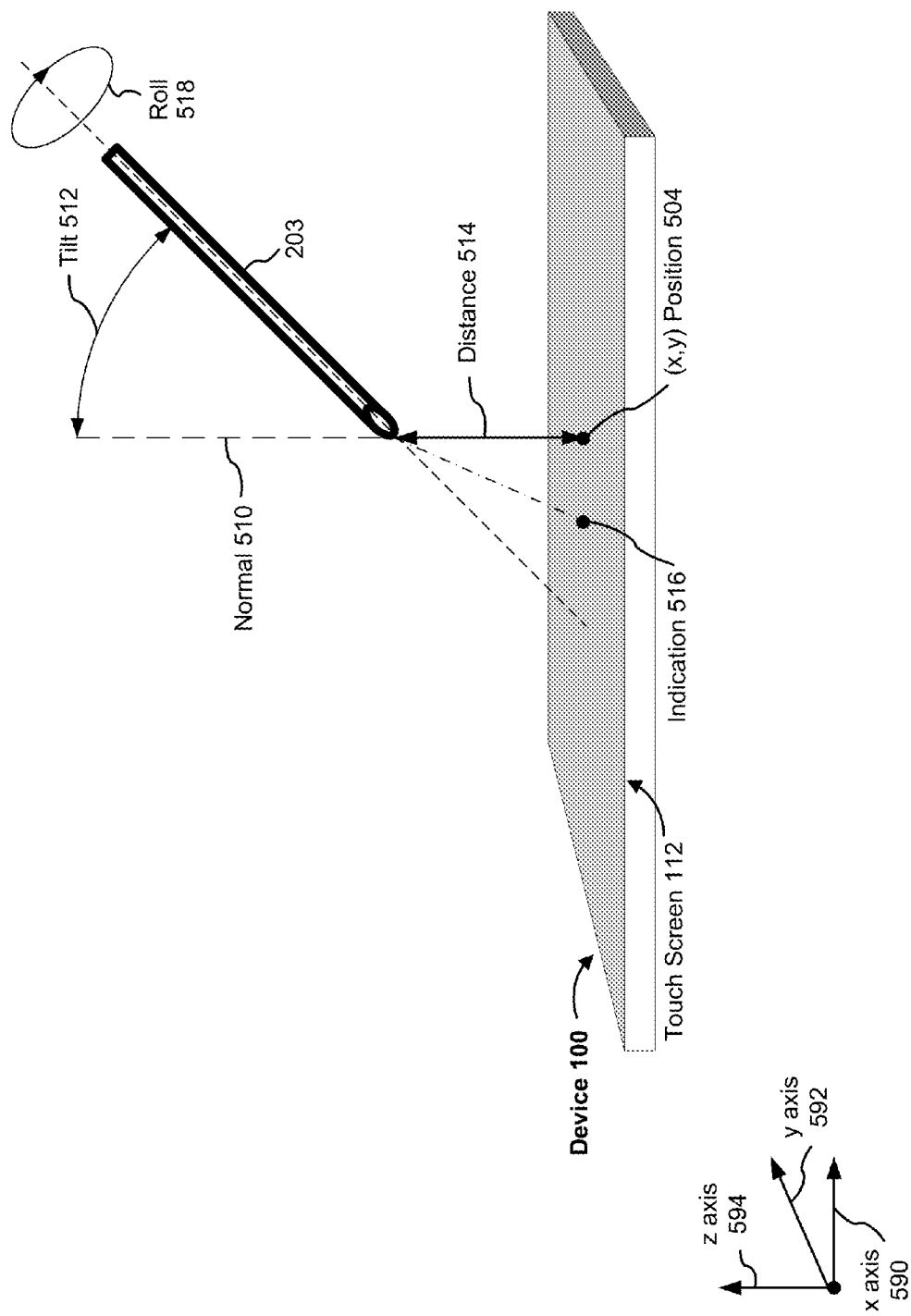

Below, FIGS. 1A-1B, 2, and 3 provide a description of exemplary devices. FIG. 4 provides a description of an exemplary electronic stylus. FIGS. 5A-5B illustrate a positional state of a stylus relative to a touch-sensitive surface. FIGS. 6A-6E and 7A-7U illustrate exemplary user interfaces for processing touch inputs that move over multiple application user interfaces. FIGS. 8A-8D illustrate a flow diagram of a method of processing touch inputs that move over multiple application user interfaces. The user interfaces in FIGS. 7A-7U are used to illustrate the processes in FIGS. 8A-8D.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, applications (or sets of instructions) 136, and/or contact information distribution module 185. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event, which is also called herein a "touch began" event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events, which are also called herein "touch moved" events), and determining if the contact has ceased (e.g., detecting a finger-up event or a break in contact, which is also called herein a "touch ended" event). These operations are described below with respect to FIGS. 6C-6D. Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154;
  online video module 155; and/or
  drawing module 175.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Contact information distribution module 185 includes software components for distributing (e.g., sending) contact information and/or motion information (e.g., one or more of the following types of information: whether a contact has occurred, an intensity of the contact, whether there is movement of the contact, whether the contact has ceased, a gesture that corresponds to a detected contact pattern, etc.) to one or more applications 136 (e.g., browser module 147 and/or drawing module 175). In some embodiments, contact information distribution module 185 is integrated with (e.g., included in) contact/motion module 130. In some embodiments, contact information distribution module 185 is integrated with (e.g., included in) operating system 126.

Each of the above identified modules and applications corresponds to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
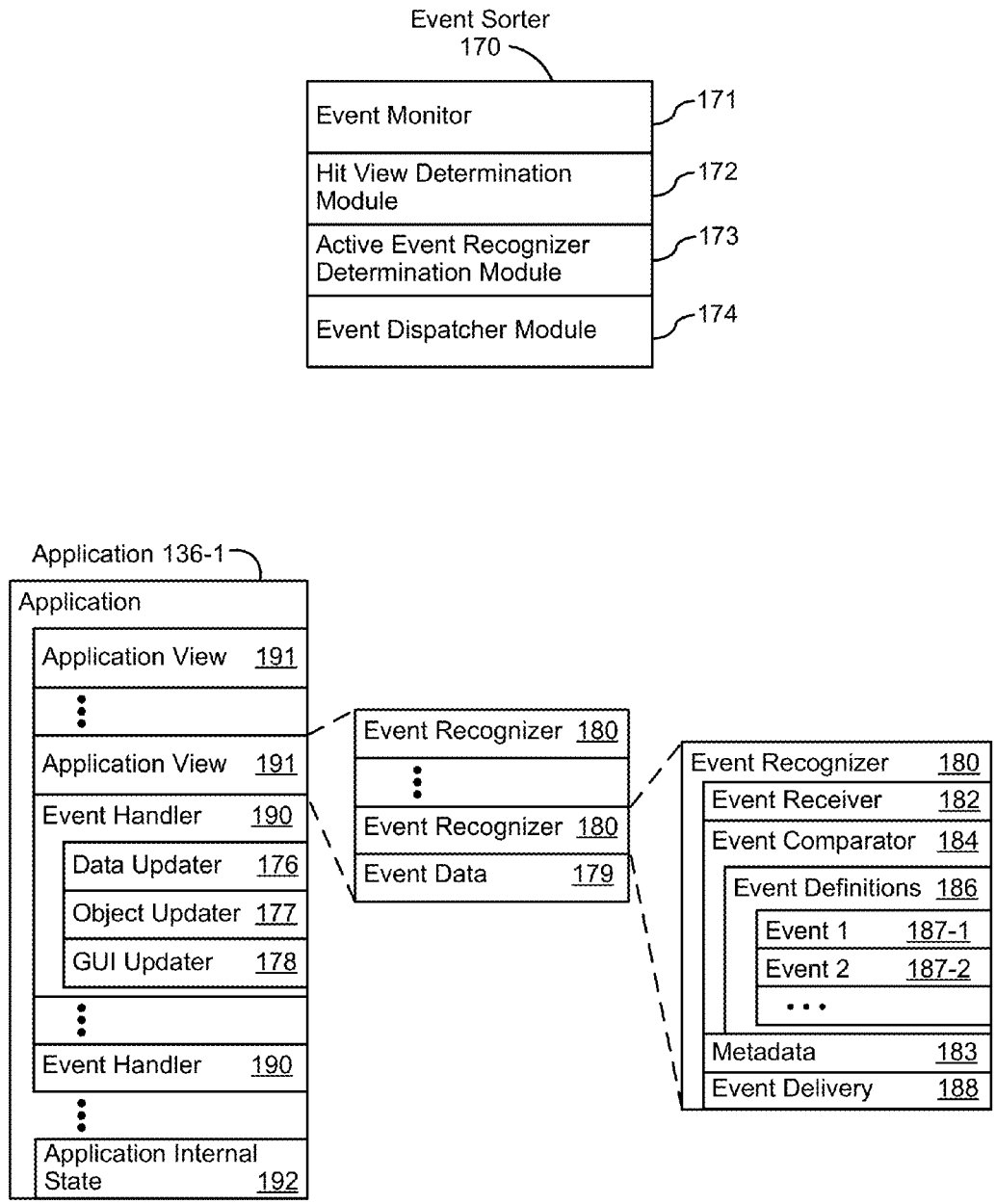
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

As used herein, a touch event refers to a device-generated signal or device-generated data (e.g., a signal or a data object generated or updated by device 100) to indicate status or a change in status of a touch input, such as beginning (e.g., contacting a touch-sensitive surface), moving (e.g., moving across a touch-sensitive surface), or ending (e.g., a lift-off) of the touch input. Although touch events are associated with physical touches (e.g., touches with a finger and/or a stylus) on the touch-sensitive surface, the touch events, as described herein, are distinct from the physical touches.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, a respective event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multi-media player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 470 (e.g., as part of an inertial measurement unit (IMU)) for obtaining information concerning the location and positional state of stylus 203. FIG. 4 shows sensors 467, 469, and 470 coupled with peripherals interface 418. Alternately, sensors 467, 469, and 470 are, optionally, coupled with an input controller 460 in I/O subsystem 406. Stylus 203 optionally includes a GPS (or GLONASS or other global navigation system) receiver (not shown) for obtaining information concerning the location of stylus 203.

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. In some embodiments, the positional state is detected in accordance with raw output, from one or more electrodes in the stylus, that is sensed by a touch-sensitive surface (e.g., touch screen 112 of device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z axis 594 points in a direction normal to the plane of touch screen 112, x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on portable multifunction device 100.

Figure 6A:
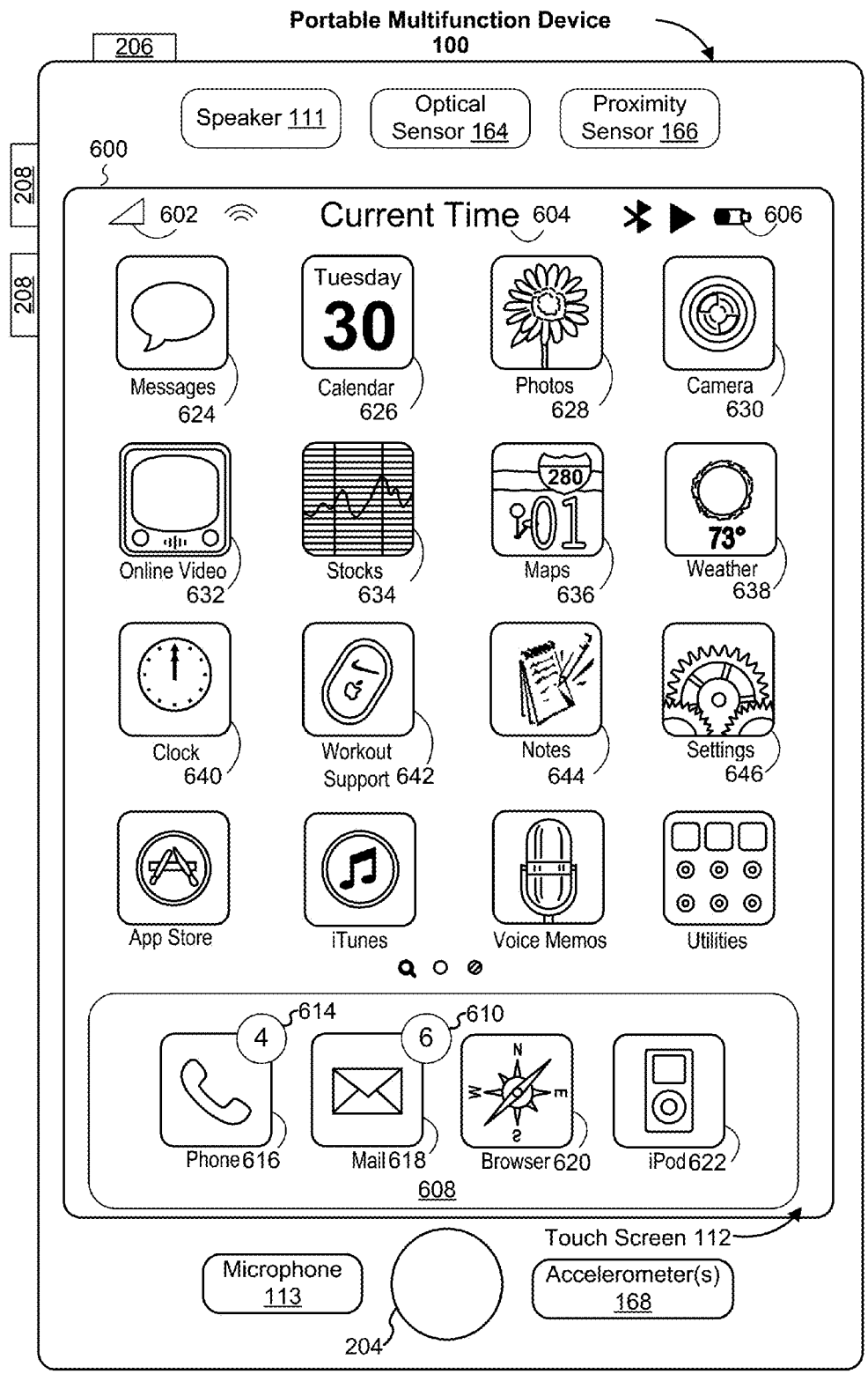
FIG. 6A illustrates an exemplary user interface for a menu of applications on a portable multifunction device in accordance with some embodiments.
Figure 7A:
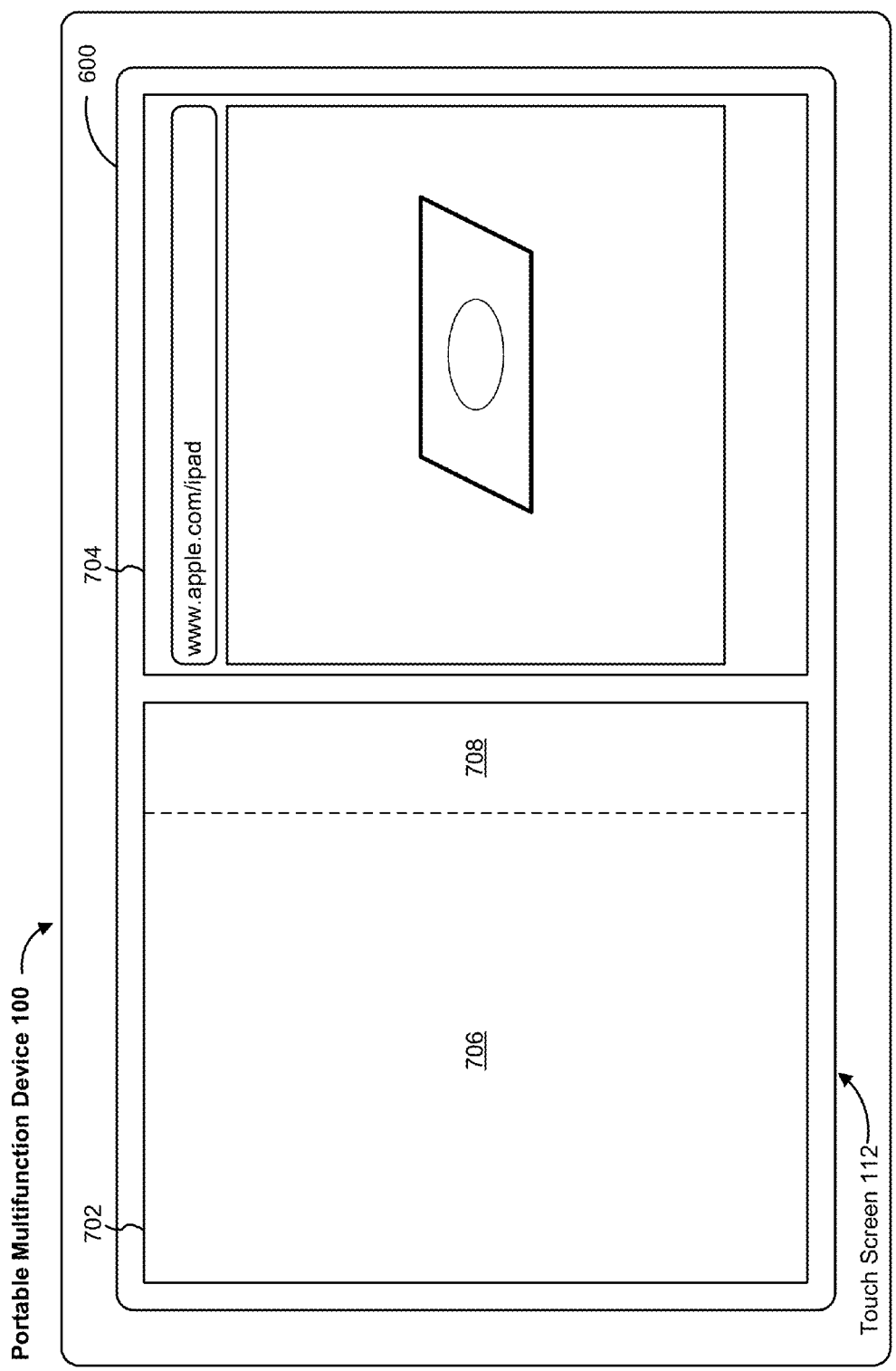
FIGS. 7A-7U illustrate exemplary user interfaces for processing a touch input that moves over multiple application user interfaces in accordance with some embodiments.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

Signal strength indicator(s) 602 for wireless communication(s), such as cellular and Wi-Fi signals;
Time 604;
Bluetooth indicator 605;
Battery status indicator 606;
Tray 608 with icons for frequently used applications, such as:
  Icon 616 for telephone module 138, labeled "Phone," which optionally includes an indicator 614 of the number of missed calls or voicemail messages;
  Icon 618 for e-mail client module 140, labeled "Mail," which optionally includes an indicator 610 of the number of unread e-mails;
  Icon 620 for browser module 147, labeled "Browser;" and
  Icon 622 for video and music player module 152, also referred to as iPod (trademark of Apple Inc.) module 152, labeled "iPod;" and
Icons for other applications, such as:
  Icon 624 for IM module 141, labeled "Messages;"
  Icon 626 for calendar module 148, labeled "Calendar;"
  Icon 628 for image management module 144, labeled "Photos;"
  Icon 630 for camera module 143, labeled "Camera;"
  Icon 632 for online video module 155, labeled "Online Video;"
  Icon 634 for stocks widget 149-2, labeled "Stocks;"
  Icon 636 for map module 154, labeled "Maps;"
  Icon 638 for weather widget 149-1, labeled "Weather;"
  Icon 640 for alarm clock widget 169-6, labeled "Clock;"
  Icon 642 for workout support module 142, labeled "Workout Support;"
  Icon 644 for notes module 153, labeled "Notes;" and
  Icon 646 for a settings application or module, which provides access to settings for device 100 and its various applications 136.

It should be noted that the icon labels illustrated in FIG. 6A are merely exemplary. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
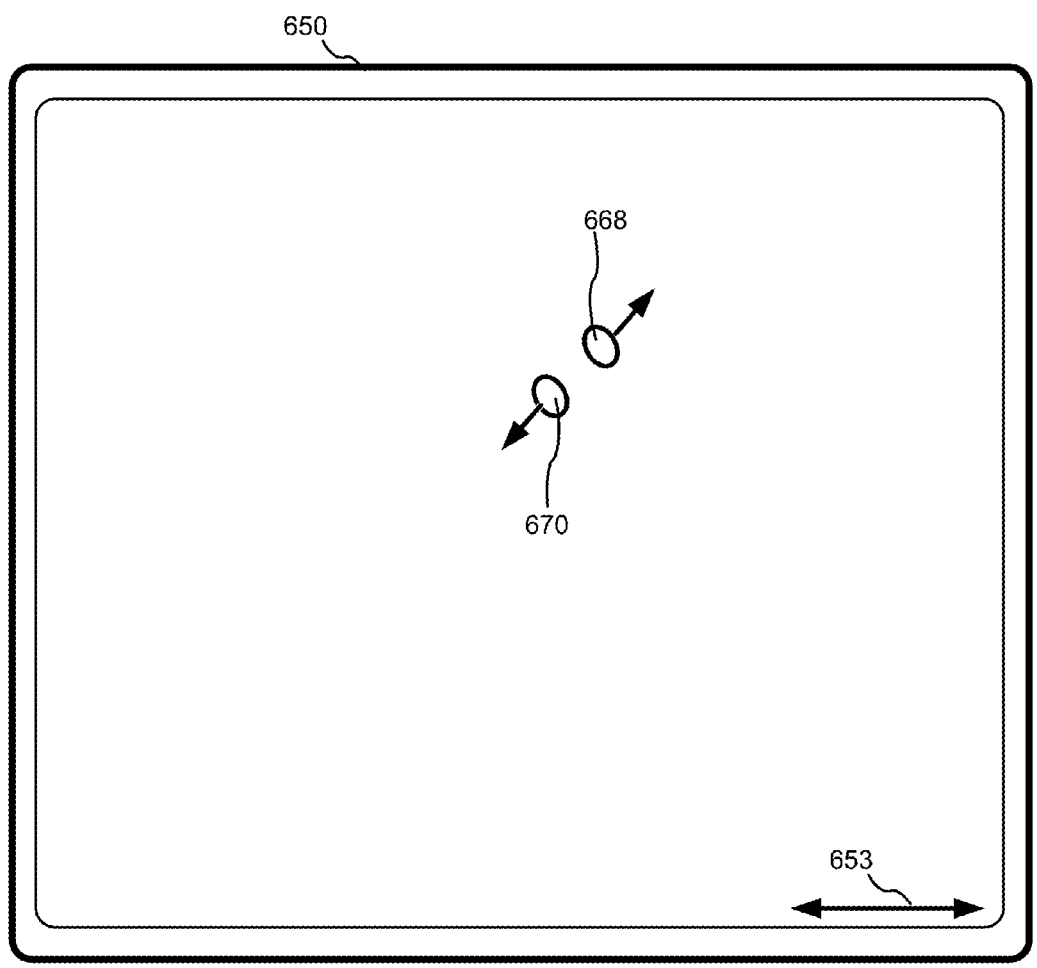
FIG. 6B illustrates an exemplary user interface for a multifunction device with a touch-sensitive surface that is separate from the display in accordance with some embodiments.
Figure 6B:
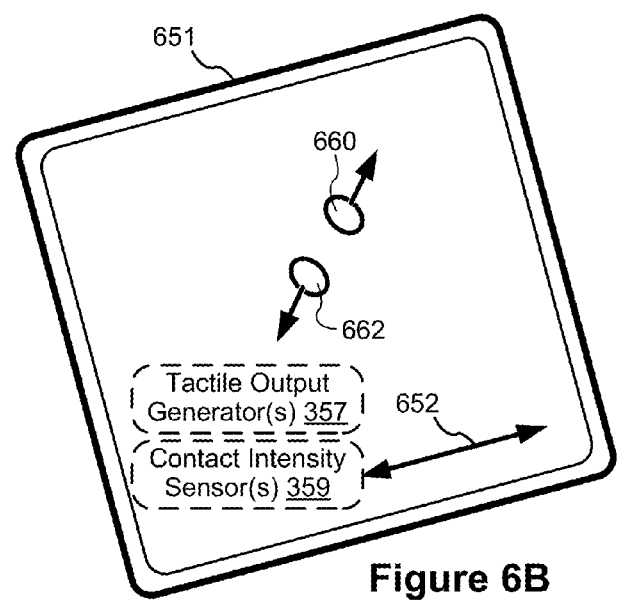

FIG. 6B illustrates an exemplary user interface on a device (e.g., device 300, FIG. 3) with a touch-sensitive surface 651 (e.g., a tablet or touchpad 355, FIG. 3) that is separate from the display 650. Device 300 also, optionally, includes one or more contact intensity sensors (e.g., one or more of sensors 359) for detecting intensity of contacts on touch-sensitive surface 651 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the device detects contacts (e.g., 660 and 662 in FIG. 6B) with the touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse-based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6C:
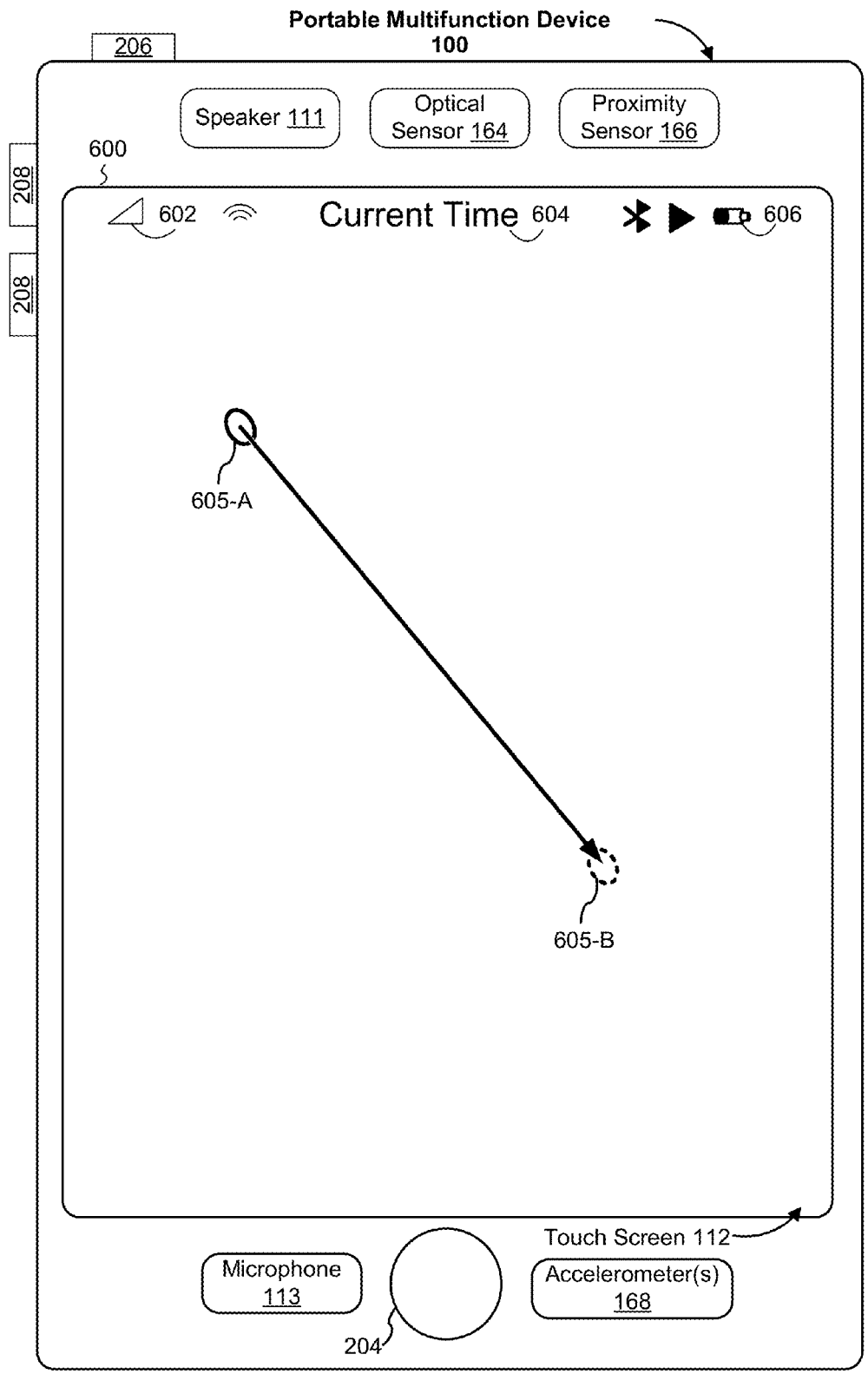
FIGS. 6C-6E illustrate exemplary user interfaces for a multifunction device with a touch-sensitive display in accordance with some embodiments.
Figure 6D:
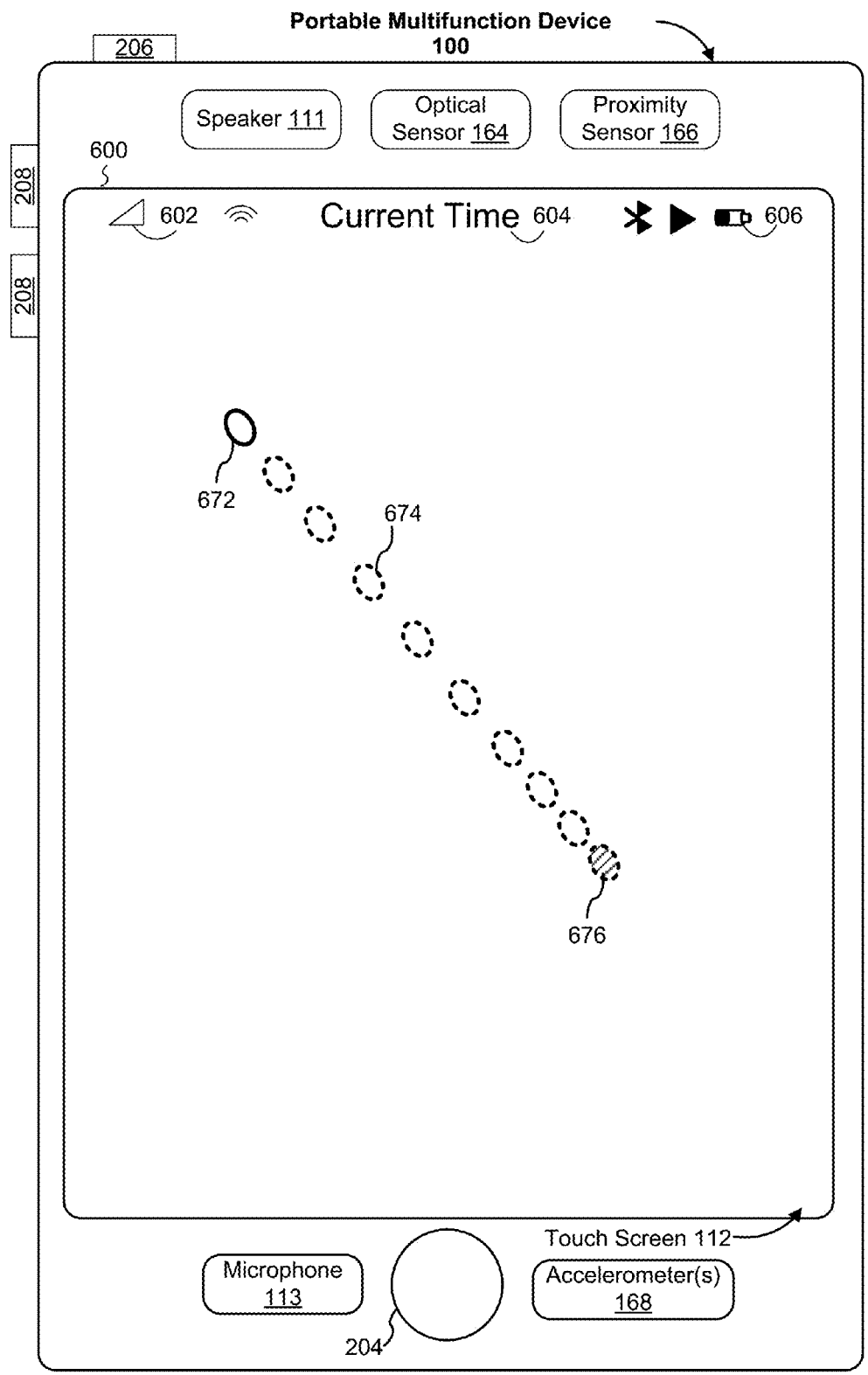
Figure 6E:
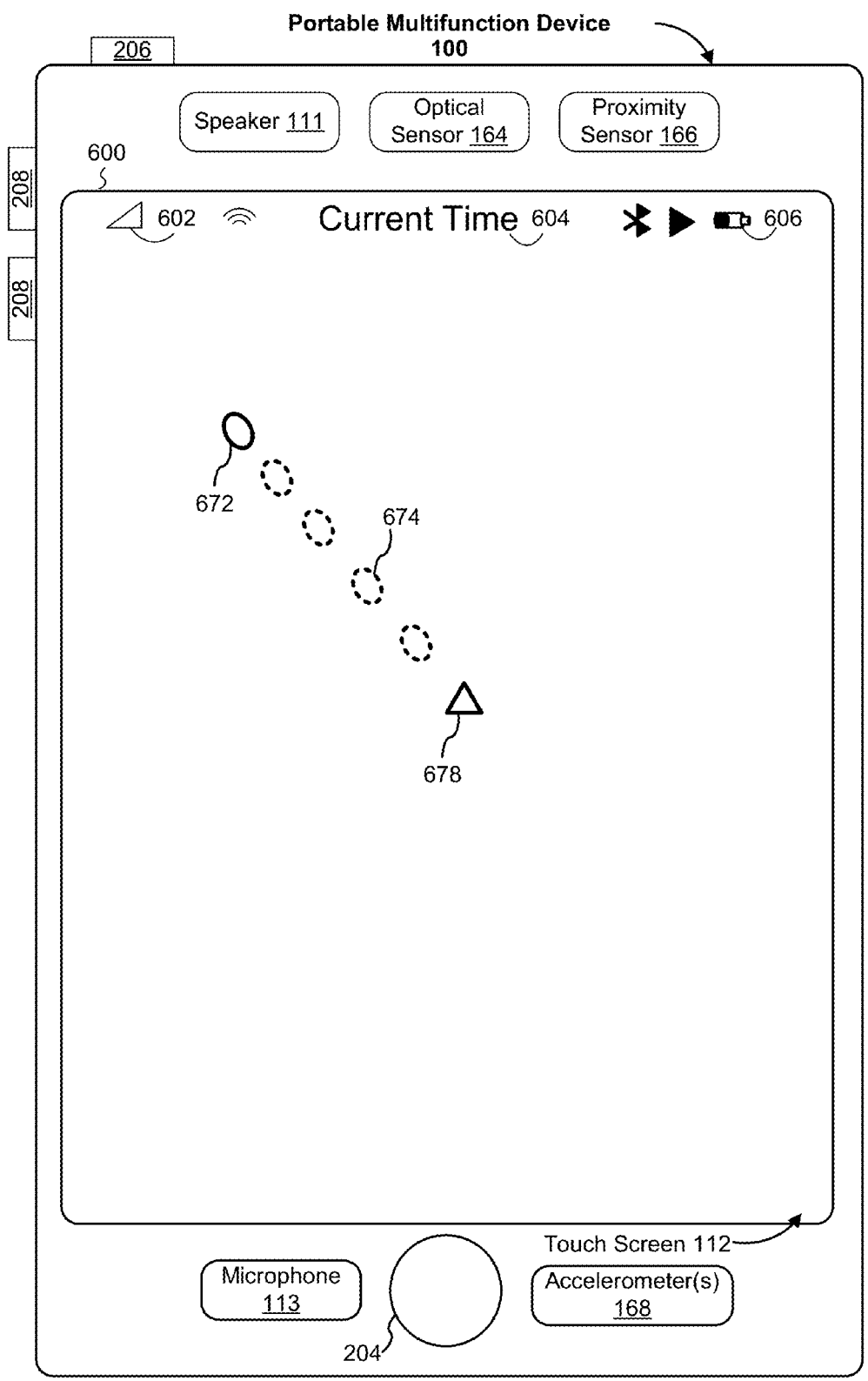

FIGS. 6C-6E illustrate exemplary user interfaces for a multifunction device 100 with a touch-sensitive display 112 in accordance with some embodiments.

FIG. 6C illustrates that contact 605 is detected on the touch-sensitive display 112. The contact 605 is initially detected at location 605-A (e.g., finger-down), subsequently moves from the location 605-A to location 605-B, and ceases to be detected at the location 605-B (e.g., finger-up).

FIG. 6D illustrates touch events that correspond to contact 605 shown in FIG. 6C. In response to detecting contact 605 (e.g., an initial contact of contact 605) on the touch-sensitive display 112, contact/motion module 130 (FIG. 1A) generates a touch began event 672 that corresponds to the location 605-A. In response to detecting movement of contact 605 on the touch-sensitive display 112, contact/motion module 130 generates touch moved events 674 that describe or otherwise correspond to locations of contact 605 (and optionally other status information for contact 605) on the touch-sensitive display 112 along the path from location 605-A to location 605-B. In response to detecting that contact 605 has ceased to be detected on the touch-sensitive display 112, contact/motion module 130 generates a touch ended event 676 that corresponds to the location 605-B.

FIG. 6E illustrates touch events that correspond to contact 605 in FIG. 6C. In FIG. 6E, contact/motion module 130 generates a touch cancel event 678 (e.g., in accordance with predefined criteria) during the movement of contact 605 from the location 605-A to the location 605-B. As used herein, a touch cancel event is also called a touch cancelled event. In some embodiments, no touch events are generated with respect to contact 605 after generating the touch cancel event regardless of whether contact 605 remains on the touch-sensitive display 112, moves across the touch-sensitive display 112, or ceases to remain on the touch-sensitive display 112. In FIG. 6E, contact/motion module 130 does not generate touch moved events regardless of contact 605 continuing to move to the location 605-B, and contact/motion module 130 does not generate a touch ended event regardless of contact 605 ceasing to be detected at location 605-B (e.g., getting lifted off from location 605-B).

In FIGS. 6D and 6E, a touch began event (e.g., 672) is graphically represented with a solid ellipse, a touch moved event (e.g., 674) is graphically represented with a dashed ellipse, a touch ended event (e.g., 676) is graphically represented with a shaded ellipse, and a touch cancel event (e.g., 678) is graphically represented with a triangle. Similar graphical representations will be used to illustrate types of touch events in FIGS. 7A-7U.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

FIGS. 7A-7U illustrate exemplary user interfaces for processing a touch input in accordance with some embodiments. The user interfaces in these figures are used to illustrate the processes described below, including the processes in FIGS. 8A-8D. Although some of the examples which follow will be given with reference to inputs on a touch-screen display (where the touch-sensitive surface and the display are combined), in some embodiments, the device detects inputs on a touch-sensitive surface 651 that is separate from the display 650, as shown in FIG. 6B. The embodiments disclosed here address the technical problem of how to best determine where touch events should be delivered, especially when the corresponding touch input starts in the display region for one application or view but crosses over to the display region of another application or view, so as to best implement the likely intent of the user. For example, one option would be to always keep a touch input associated with the application or view where it touched down, but then there would be no way to enable edge swipes for applications displayed side-by-side on the same display, and furthermore this would make the processing of touch inputs very sensitive to initial touch location. Another option would be to always switch the delivery of touch events from one application or view to another application or view when the touch crosses a boundary between the two applications or views, but this would leads to jittery behavior at the boundary. The embodiments describe below provide improved handling of touch inputs in such circumstances, by intelligently determining which application or view to provide touch events to, and smoothly handling touch input transitions from one display region to another.

FIG. 7A illustrates that the user interface 600 includes a first region 702 and a second region 704. In FIG. 7A, first region 702 corresponds to a drawing application (e.g., drawing module 175 in FIG. 1A) and second region 704 corresponds to a browser application (e.g., browser module 147 in FIG. 1A). The first region 702 includes a user interface of the drawing application, and second region 704 includes a user interface of the browser application. In FIG. 7A, second region 704 includes display of a particular web page. In some embodiments, first region 702 is in contact with (e.g., adjacent or bordering) second region 704 (e.g., FIG. 7U). In some embodiments, first region 702 is separated from (e.g., not adjacent, not in contact with, or not bordering) second region 704 as shown in FIG. 7A.

FIG. 7A also illustrates that first region 702 includes a non-boundary region 706 that is located away from second region 704. In FIG. 7A, first region 702 also includes a boundary region 708 that is located between non-boundary region 706 and second region 704. In some embodiments, boundary region 708 is in contact with non-boundary region 706 as shown in FIG. 7A. In some embodiments, boundary region 708 defines an edge of first region 702 (e.g., boundary region 708 defines the right edge of first region 702).

Figure 7B:
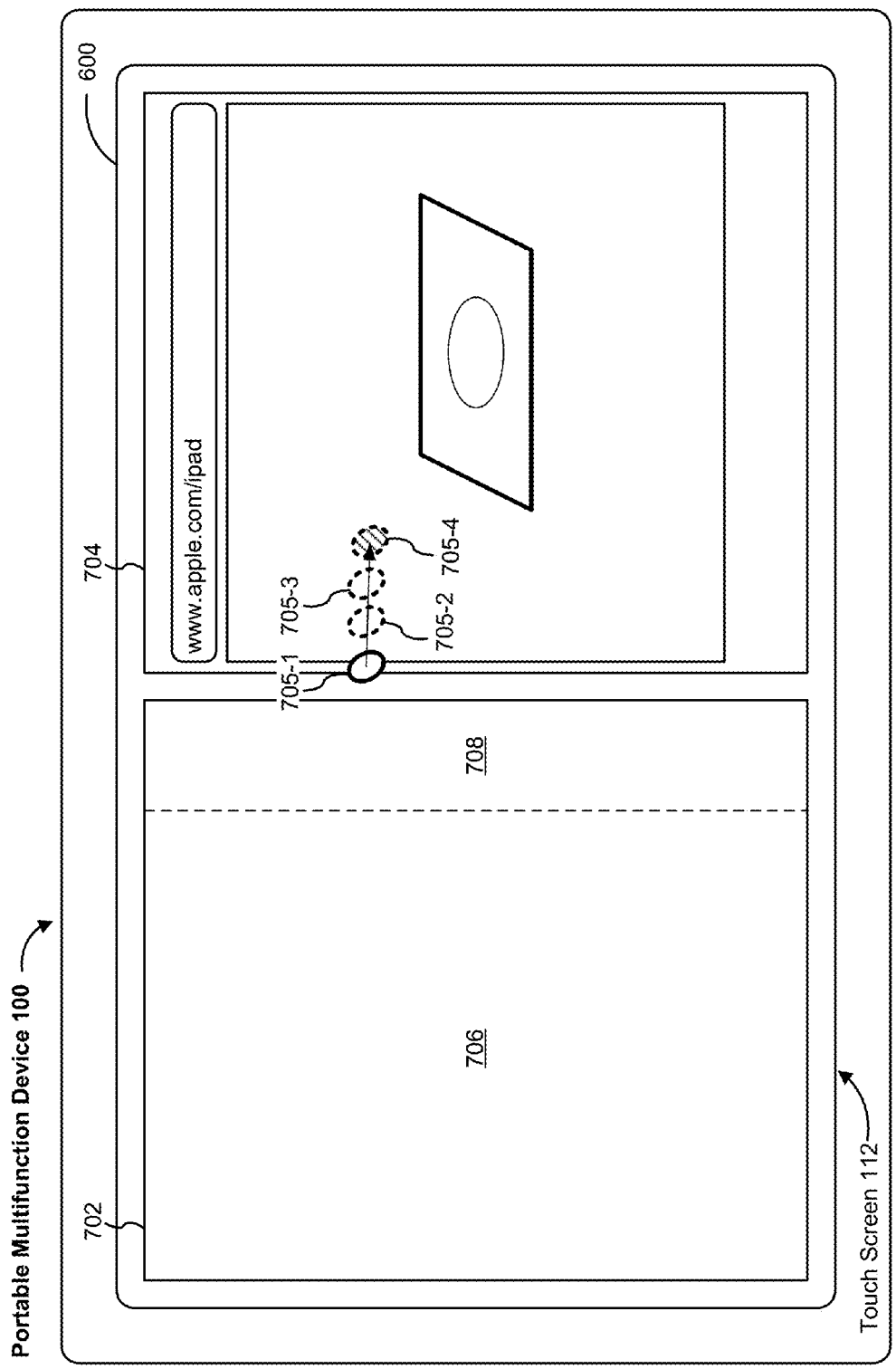
Figure 7C:
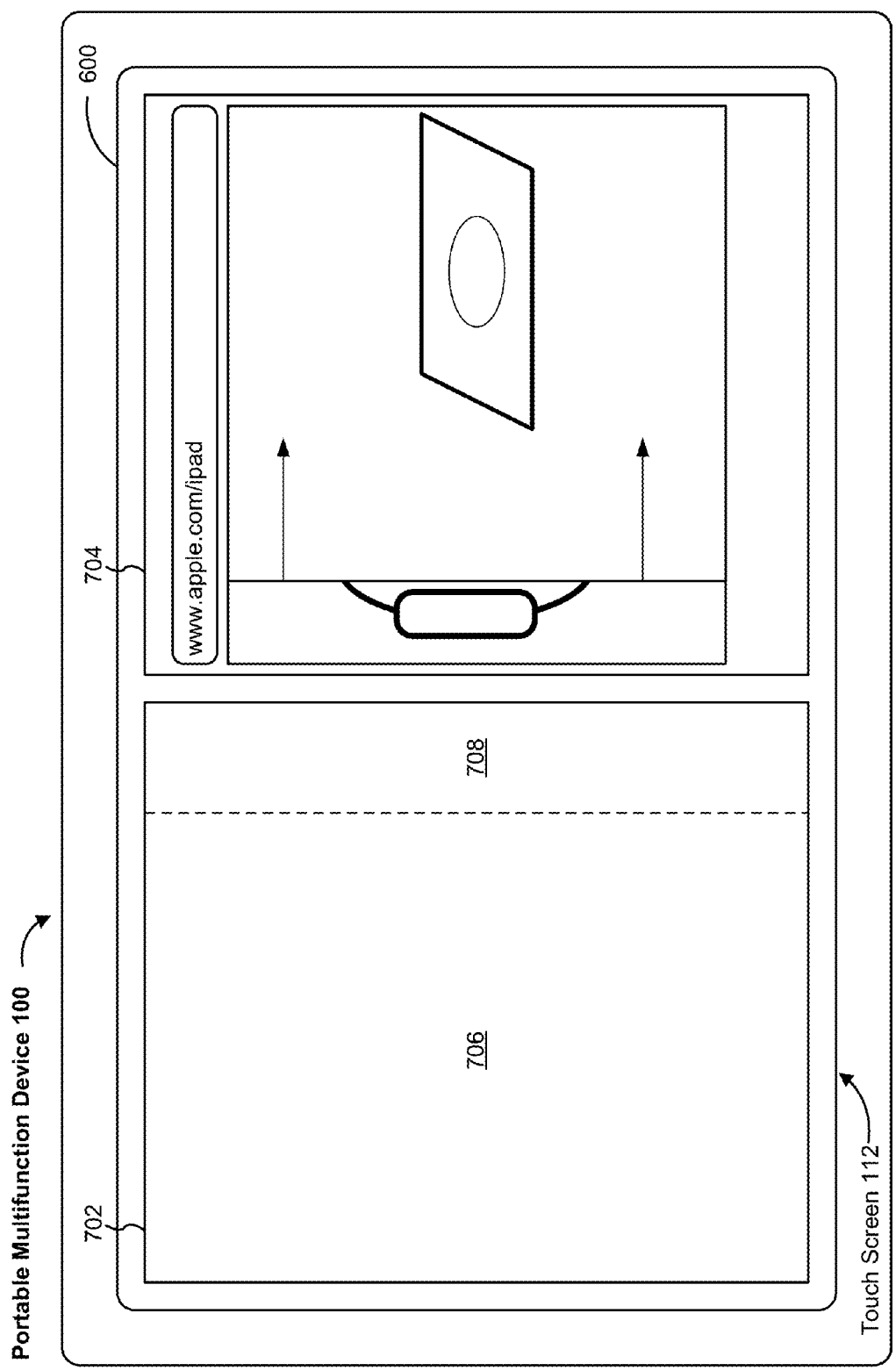
Figure 7D:
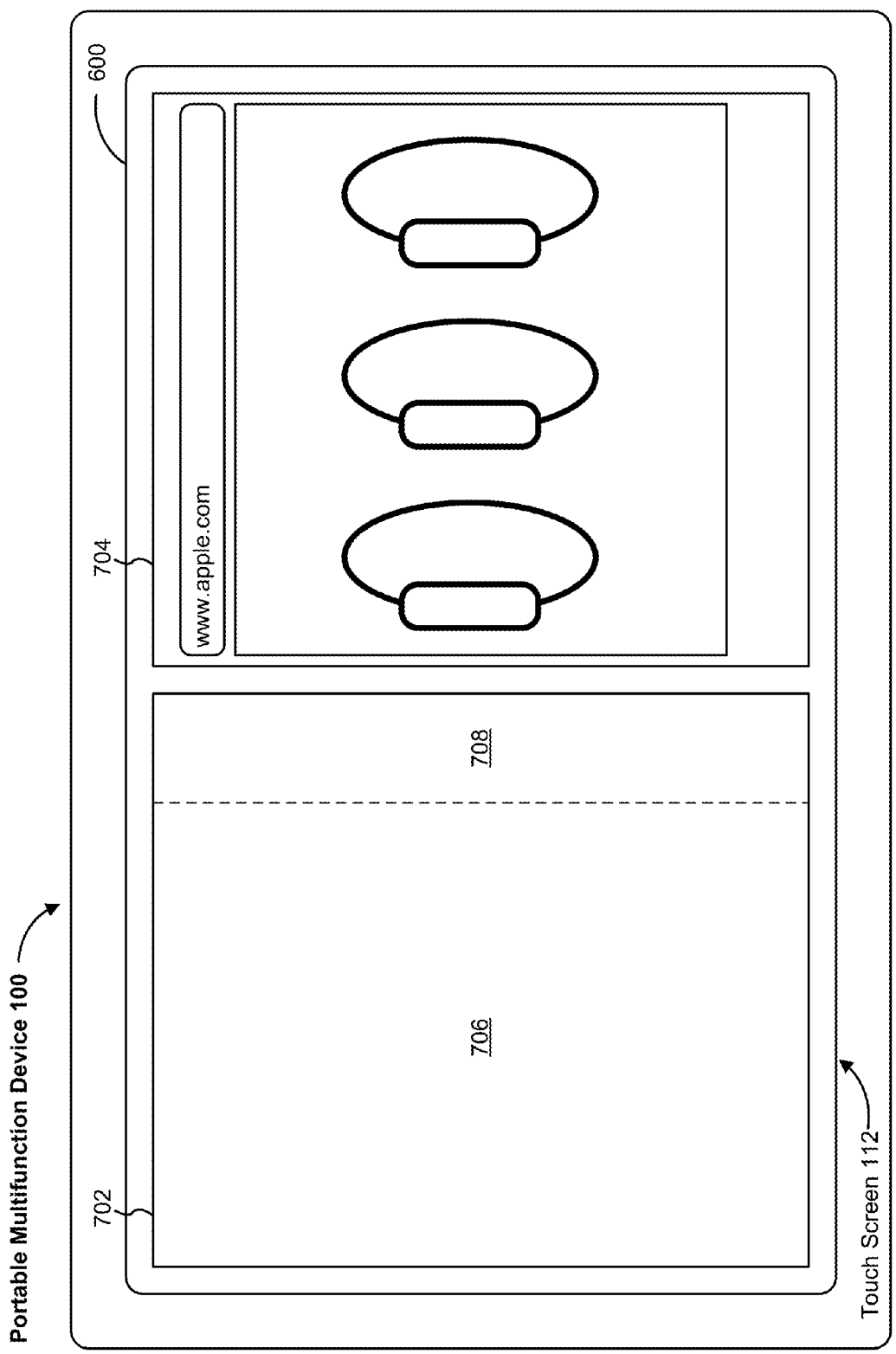

FIGS. 7B-7D illustrate operations associated with an edge swipe gesture in accordance with some embodiments.

FIG. 7B illustrates touch events 705 that correspond to a touch input that originates from the left edge of second region 704 and moves toward the right side of second region 704 (e.g., an edge swipe gesture for second region 704). The touch events 705 include a touch began event 705-1 that corresponds to the left edge of second region 704, touch moved events 705-2 and 705-3, and a touch ended event 705-4.

FIGS. 7C-7D illustrate that, in response to touch events 705-1 through 705-4 (or the touch input that corresponds to touch events 705-1 through 705-4), second region 704 is updated. In FIGS. 7C and 7D, display of the particular web page is replaced with display of a previous web page, with the replacement being accomplished through a transition animation (e.g., display of the particular web page slides toward the right side of second region 704 and reveals the previous web page).

However, when first region 702 and second region 704 are located adjacent to each other, a user may start the touch input in first region 702 (e.g., by unintentionally contacting first region 702). In addition, requiring the user to start the touch input precisely from the edge of second region 704 demands significant efforts and concentration from the user.

Figure 7E:
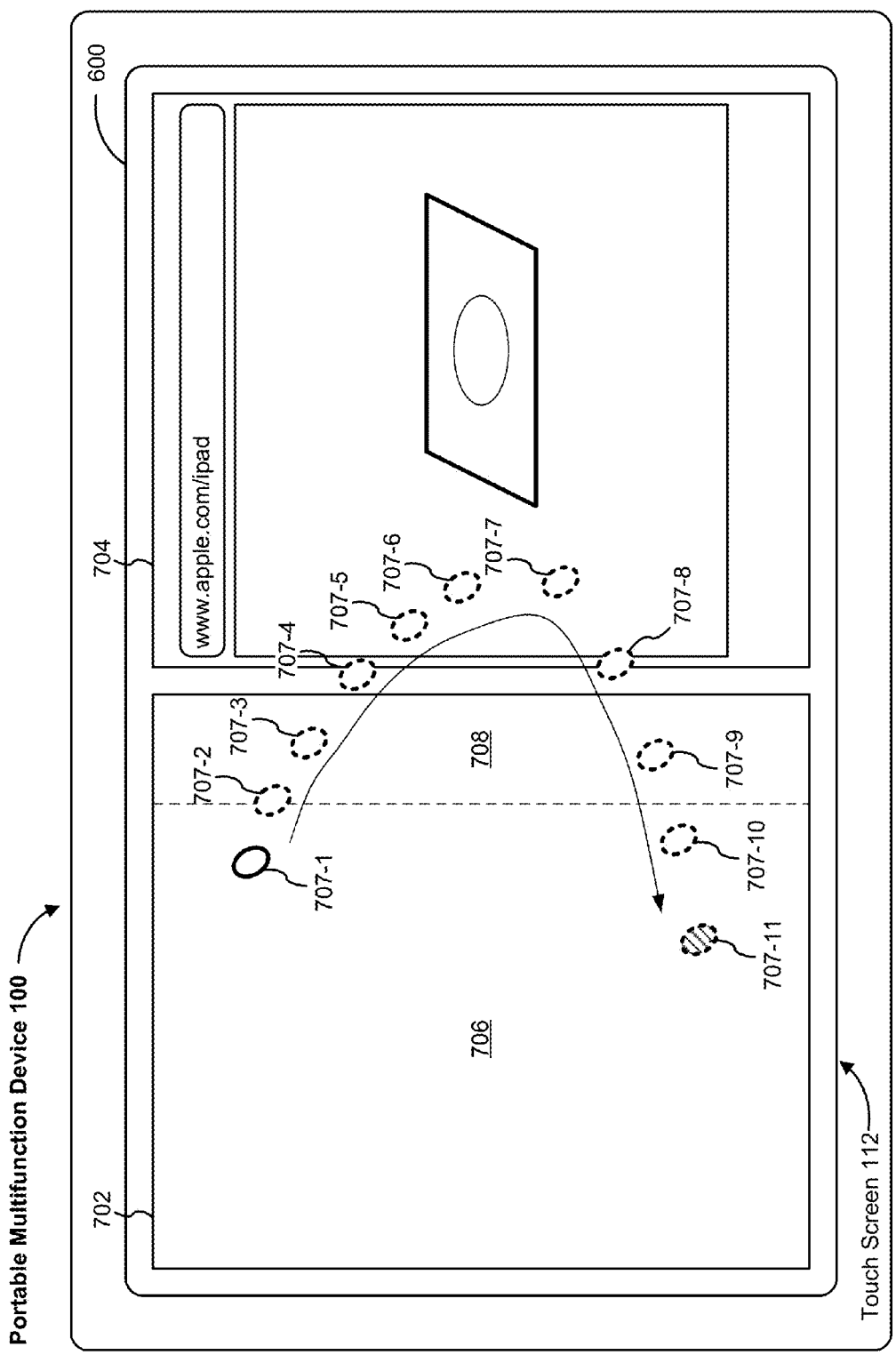
Figure 7G:
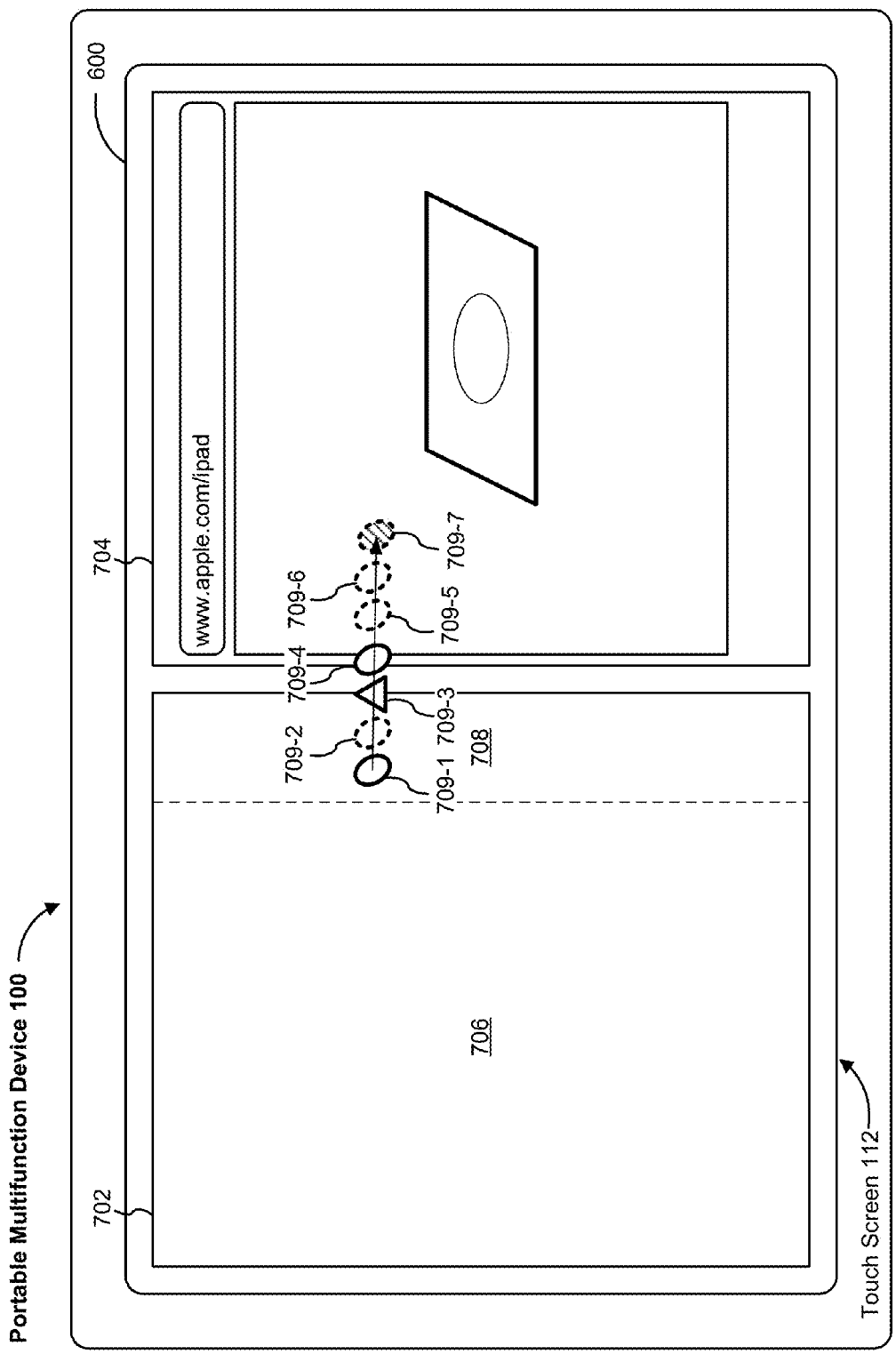
Figure 7H:
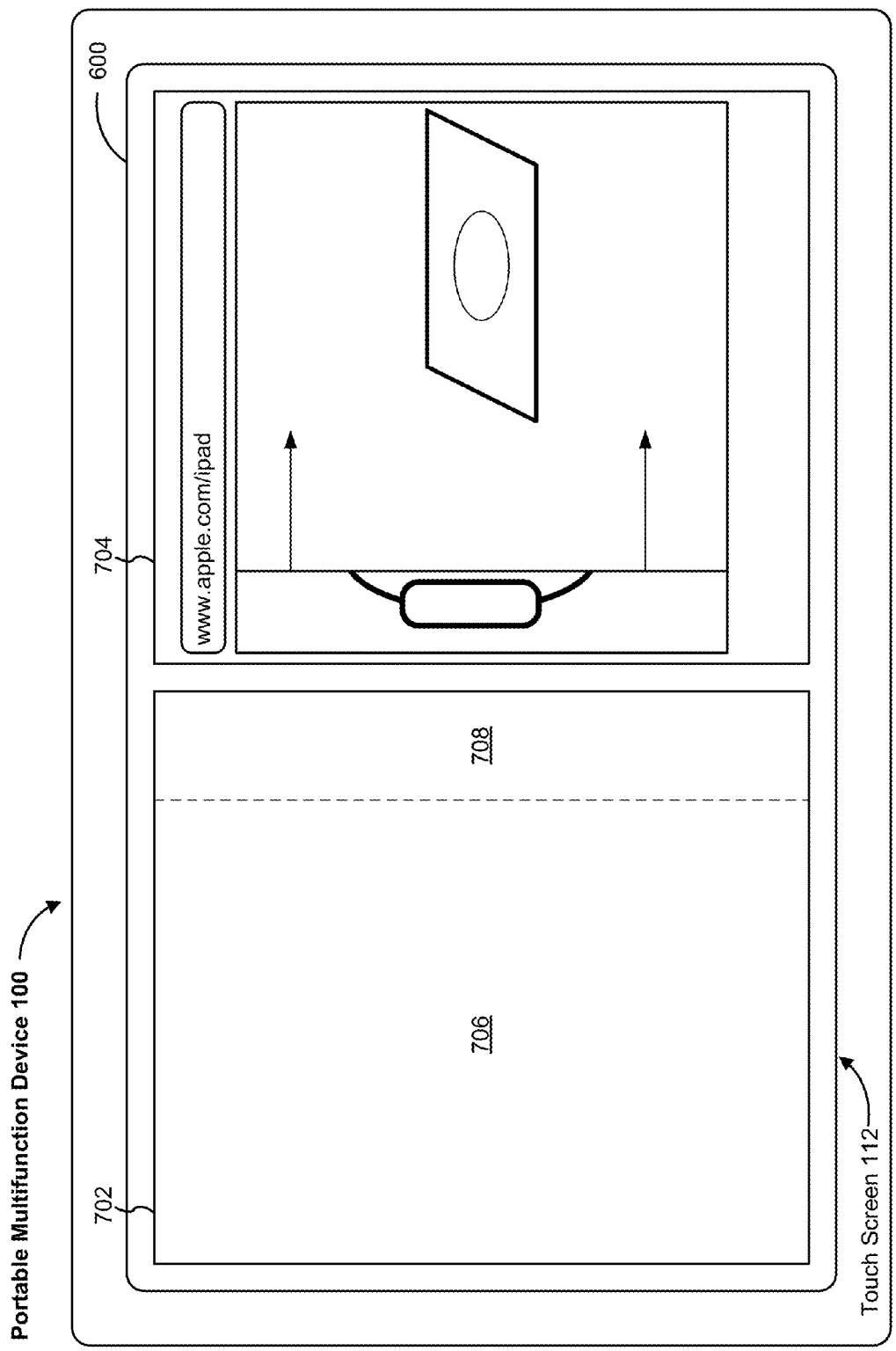
Figure 7I:
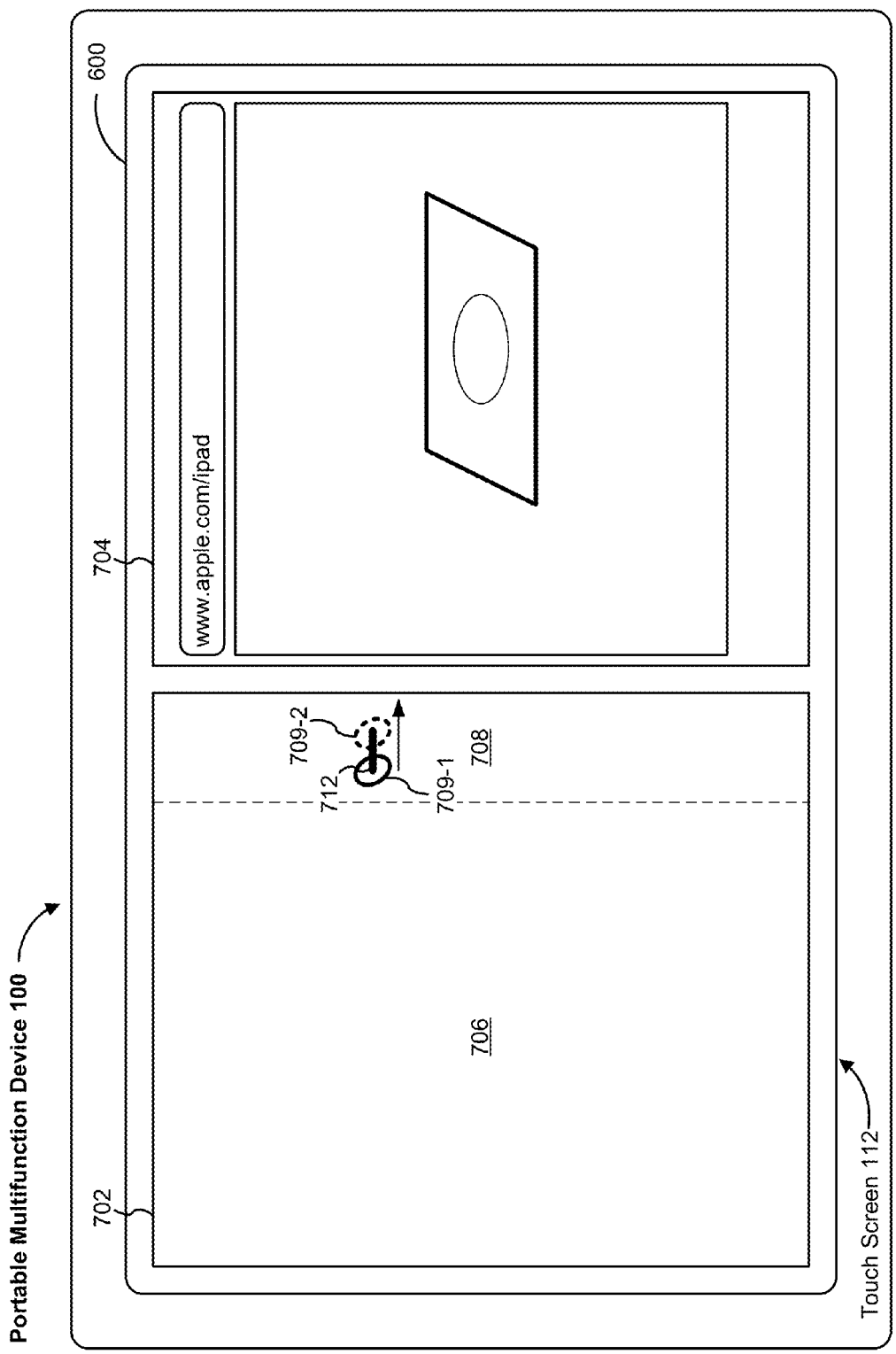
Figure 7K:
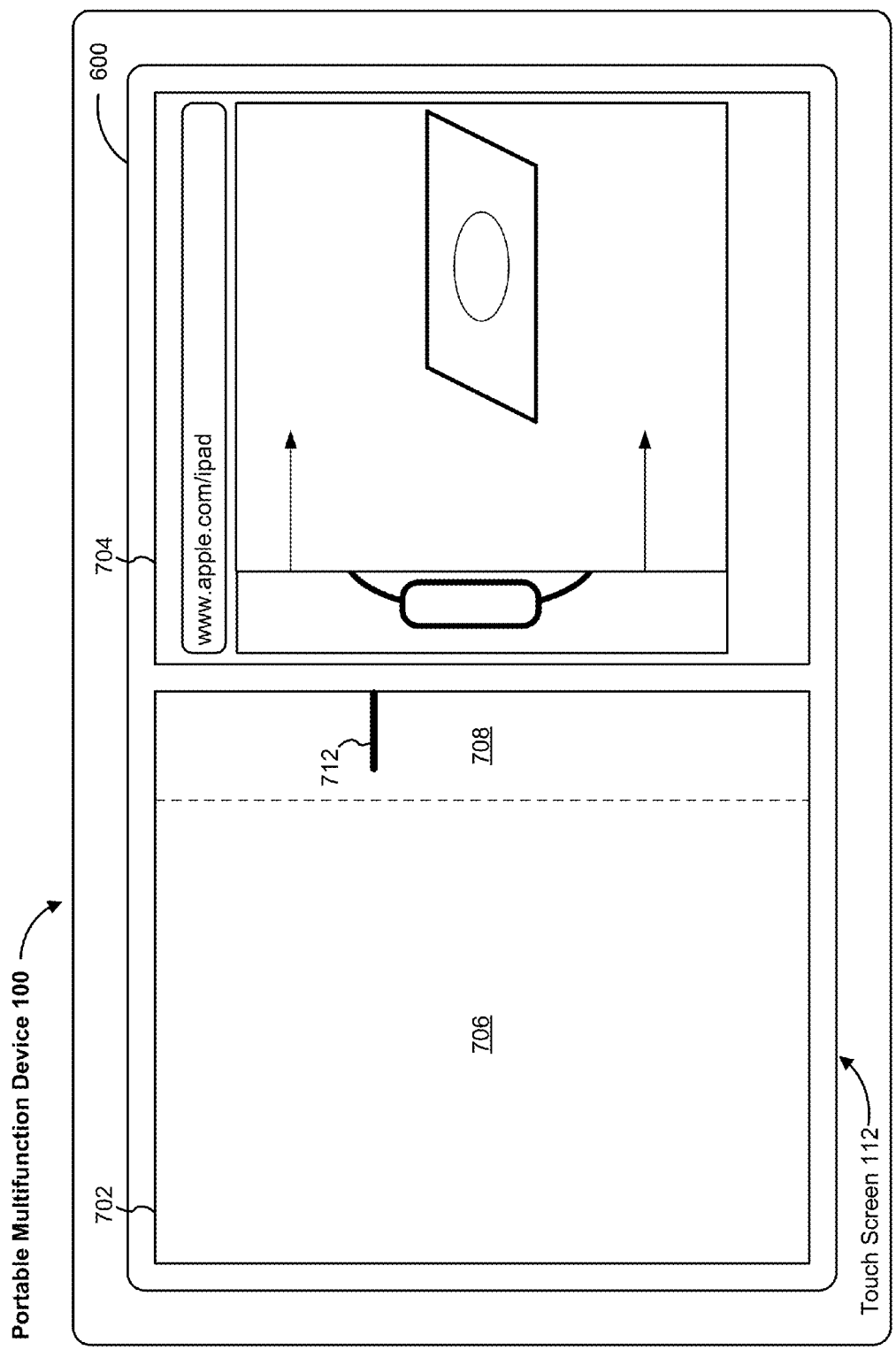
Figure 7L:
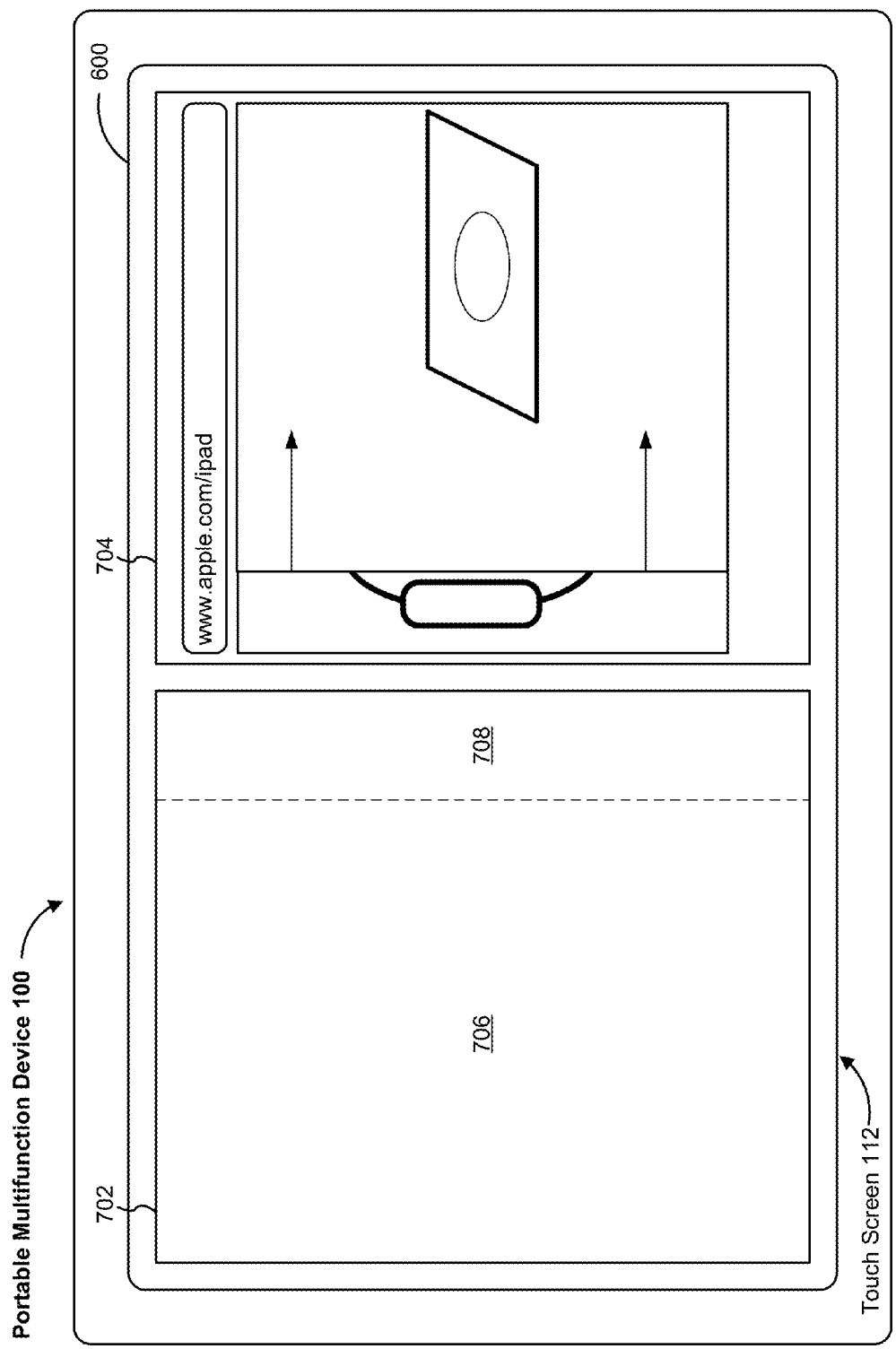
Figure 7N:
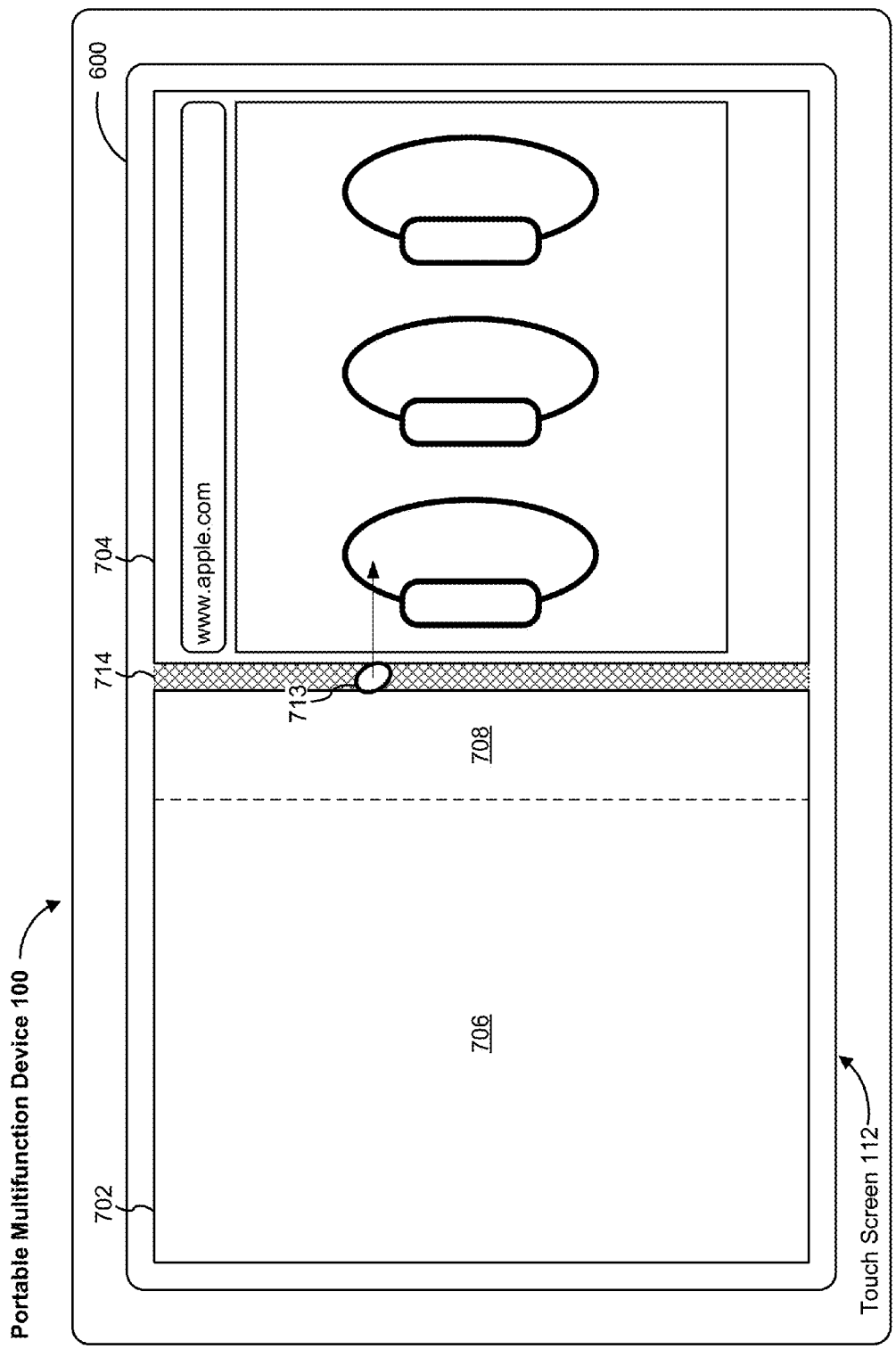
Figure 7Q:
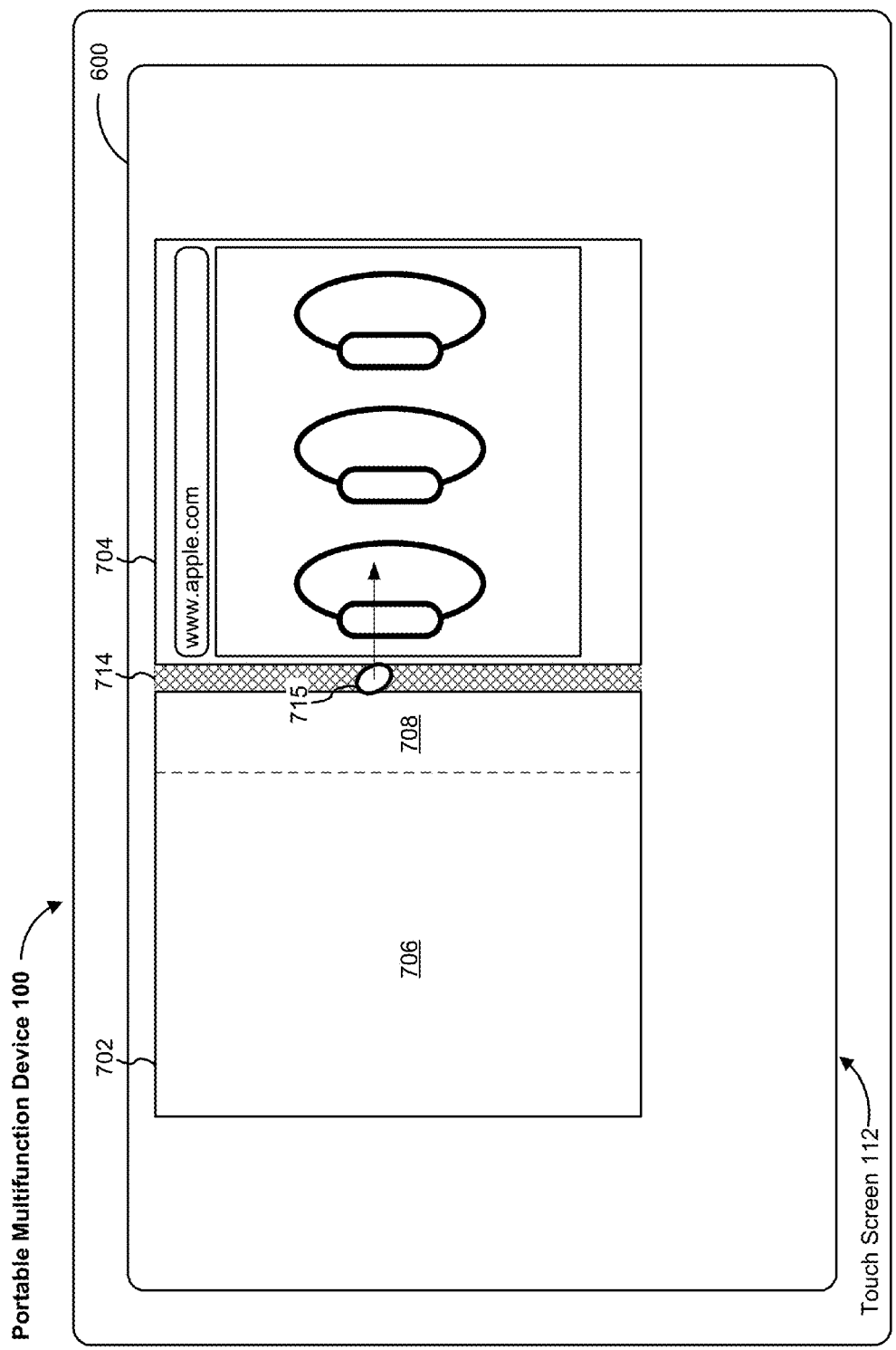
Figure 7R:
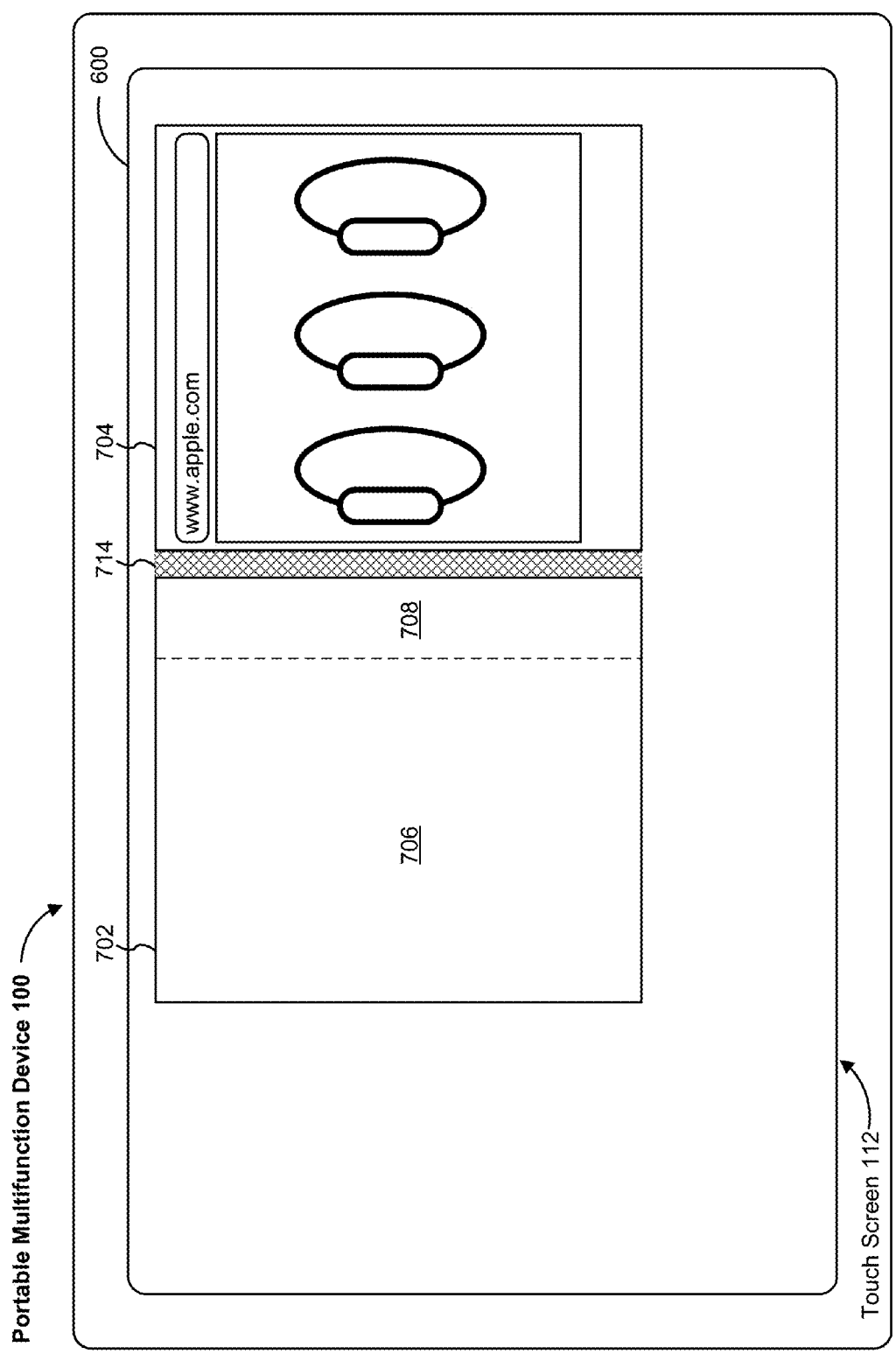
Figure 7S:
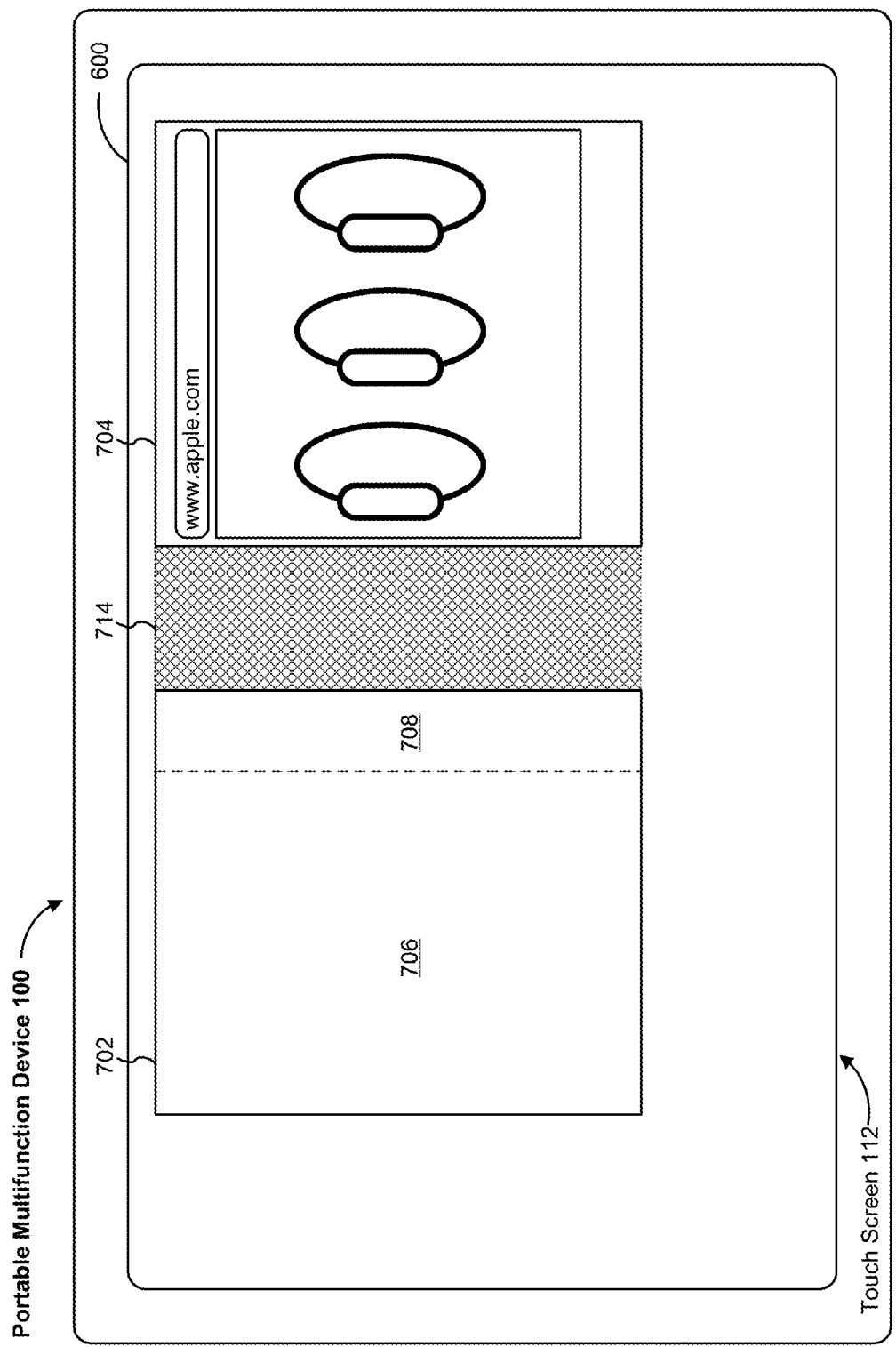
Figure 7T:
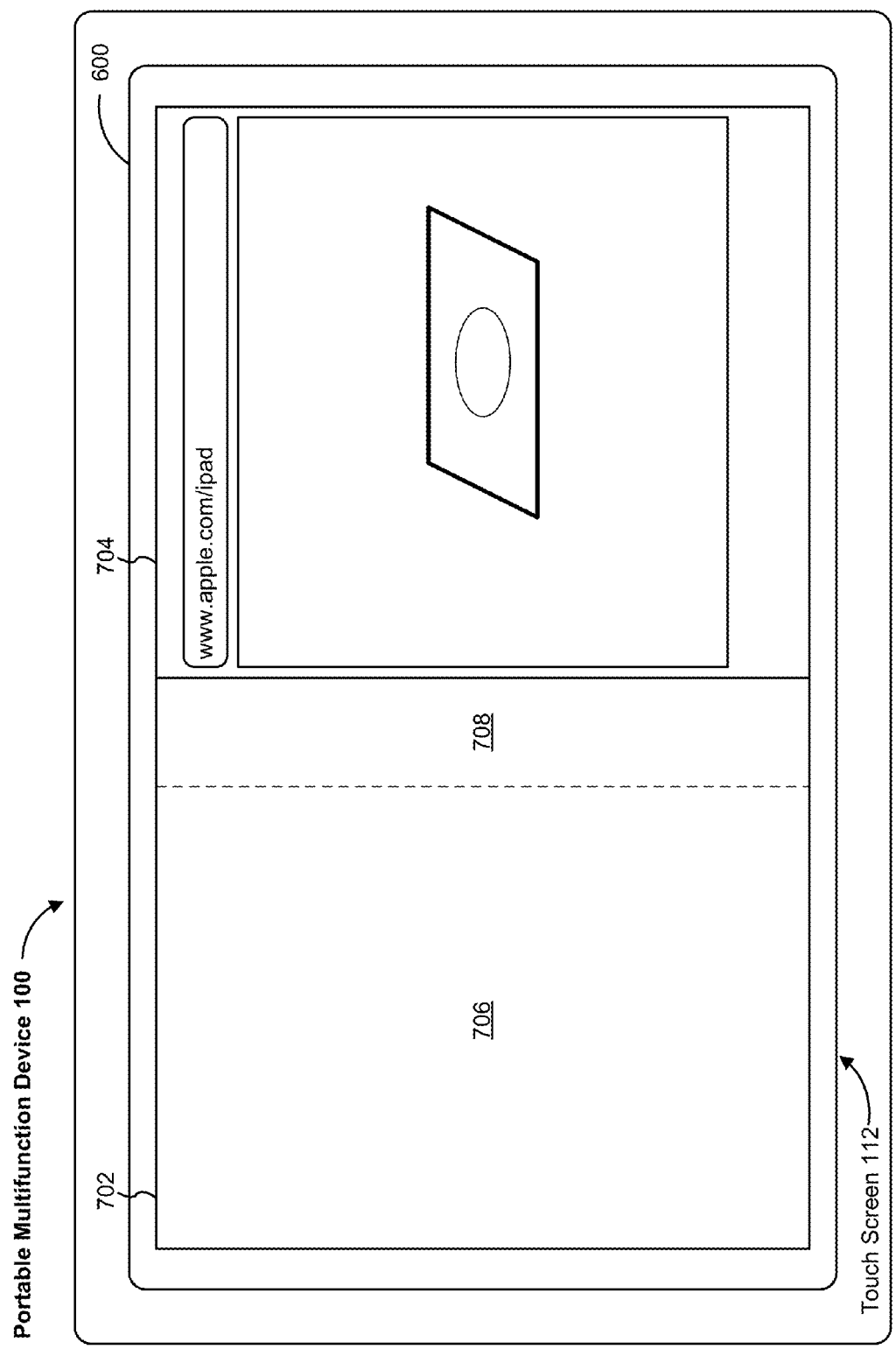
Figure 7U:
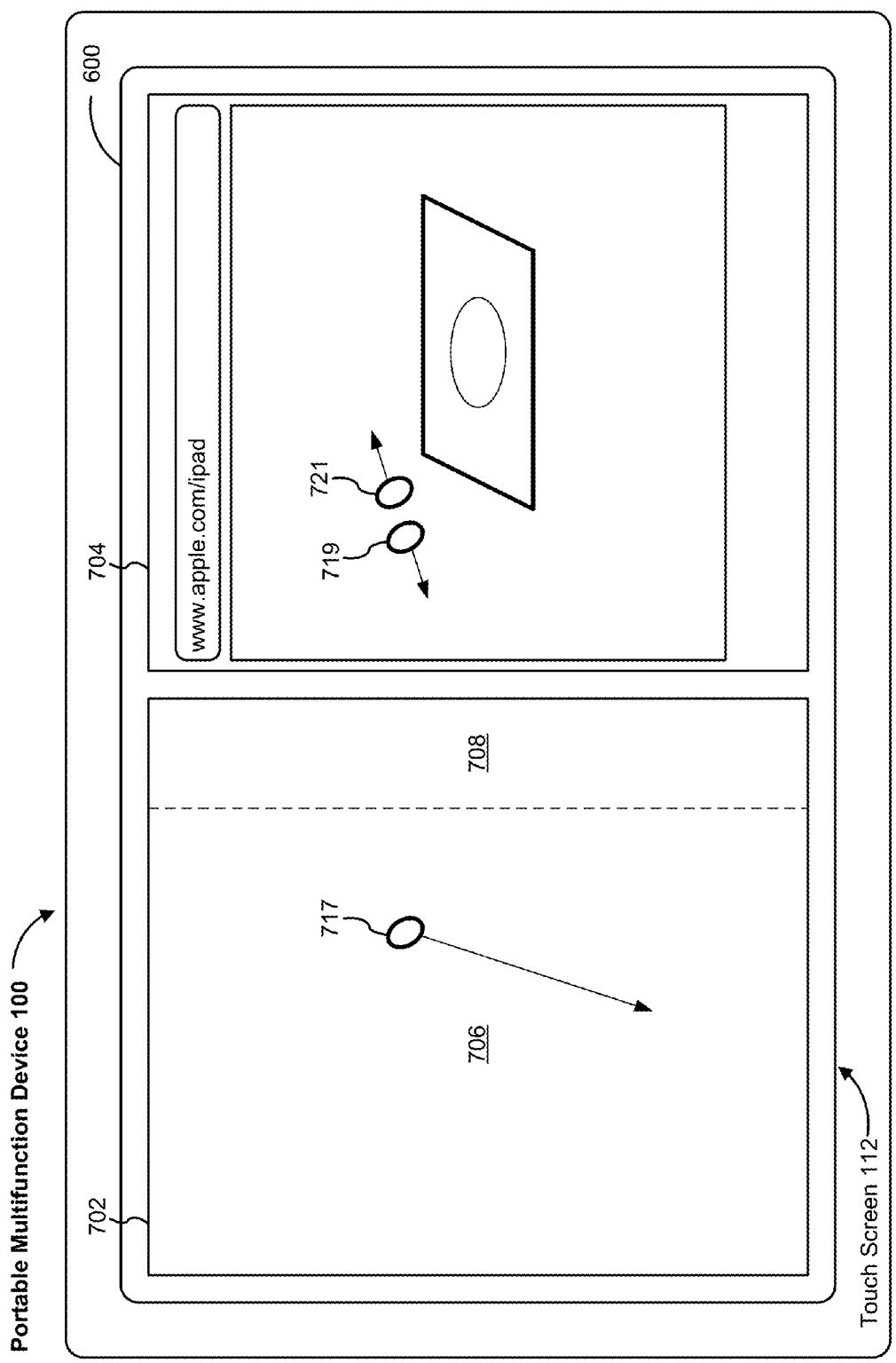
Figure 8B:
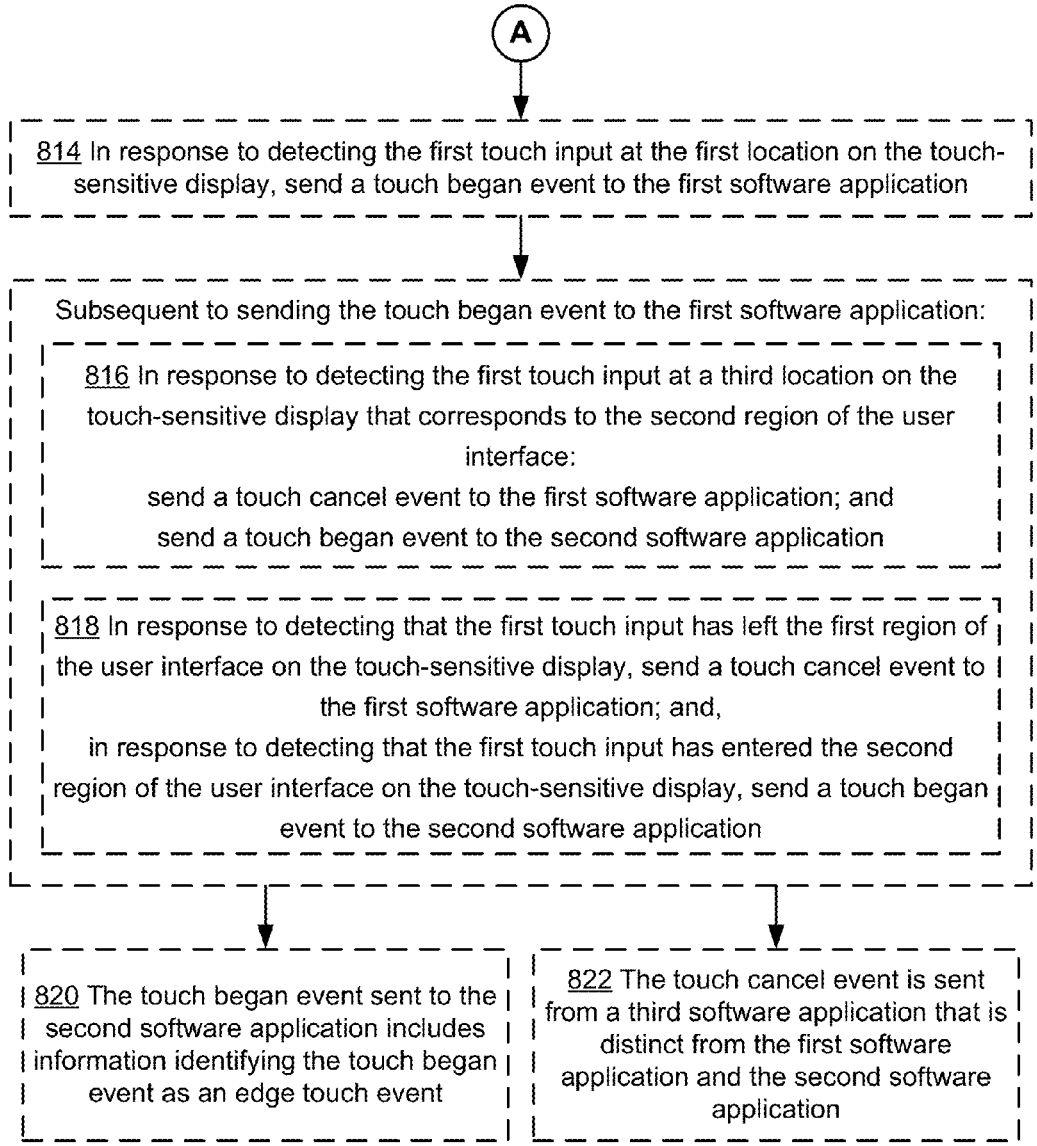
Figure 8C:
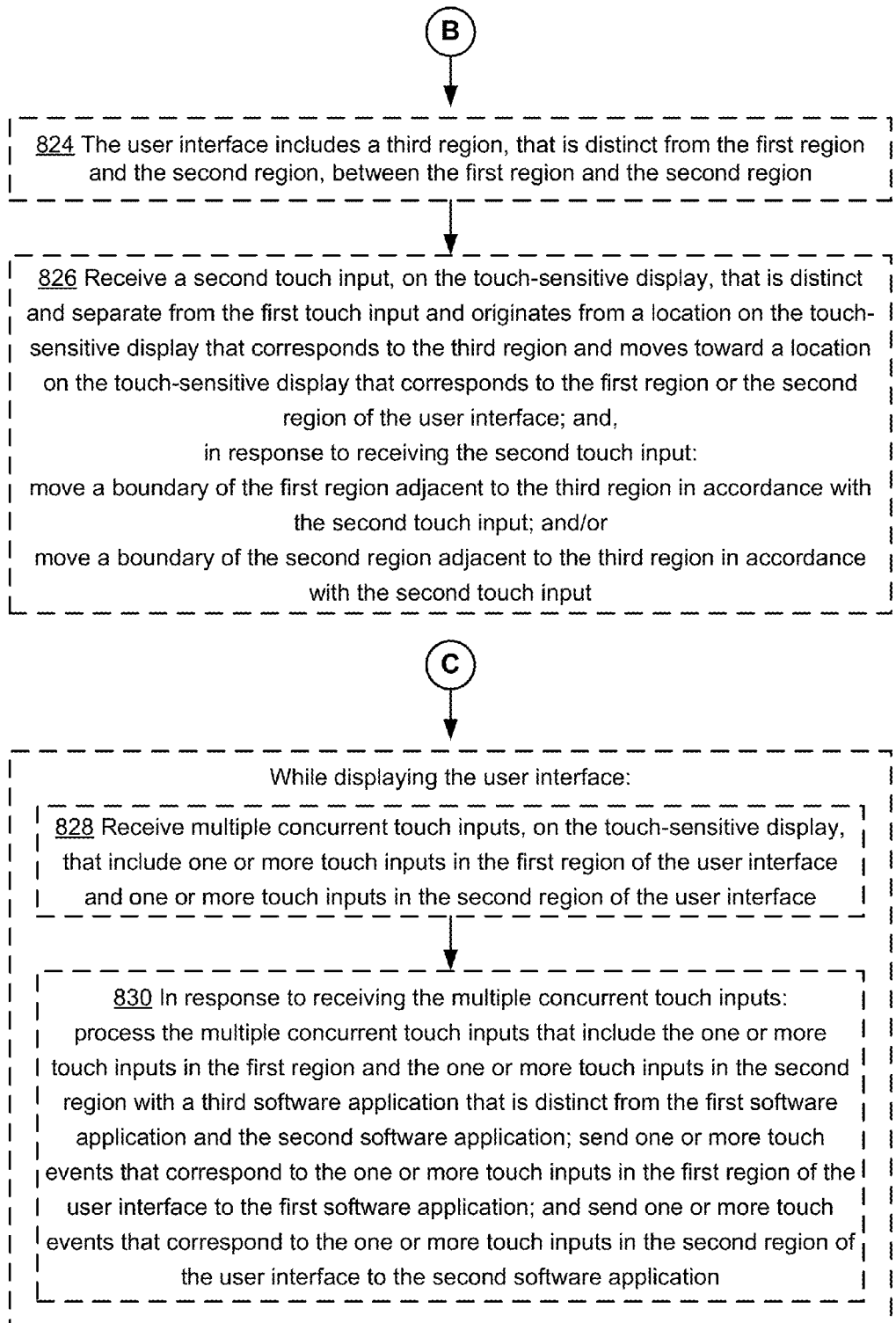
Figure 8D:
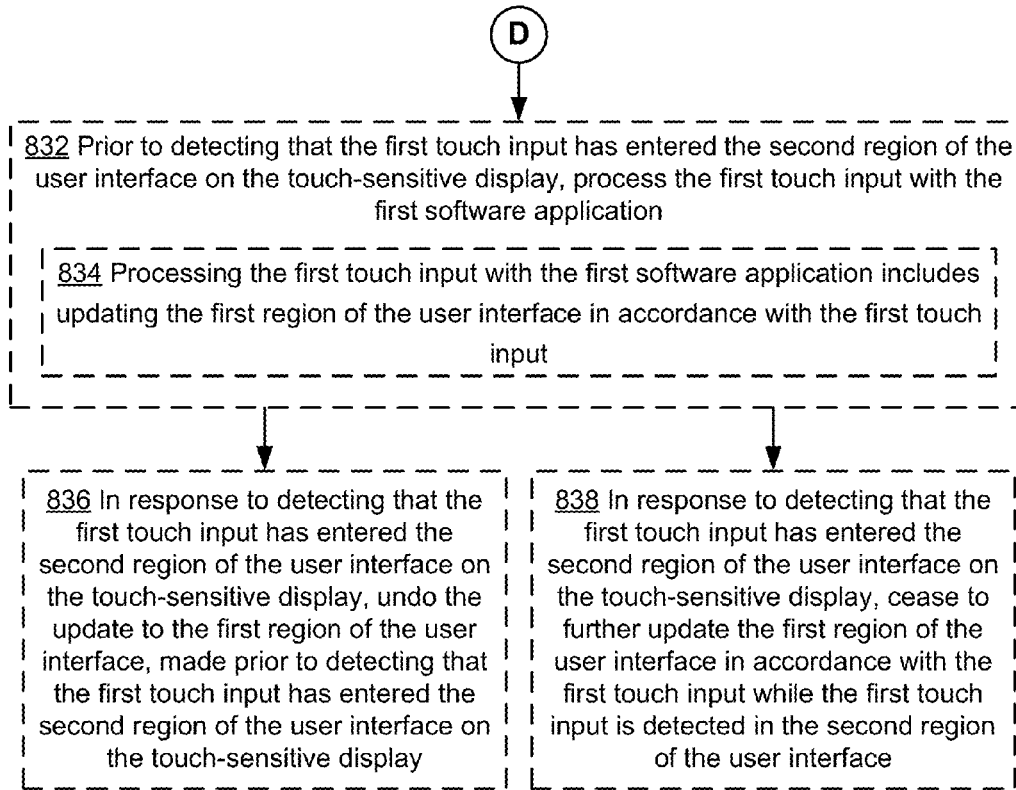

The methods and interfaces illustrated in FIGS. 7E-7U provide efficient processing of touch inputs that, purposefully or accidentally, move over multiple application user interfaces. Such methods and interfaces optionally complement or replace conventional methods for processing touch inputs that move over multiple application user interfaces. Such methods and interfaces reduce the cognitive burden on a user and produce a more efficient human-machine interface. For battery-operated devices, such methods and interfaces conserve power and increase the time between battery charges.

FIGS. 7E-7F illustrate touch events that correspond to a touch input that originates from non-boundary region 706 of first region 702 and extends to second region 704 (and returns to first region 702) in accordance with some embodiments. The touch events include a touch began event 707-1 that corresponds to boundary region 706 of first region 702, touch moved events 707-2 through 707-10 (including touch moved events 707-2 and 707-3 that correspond to boundary region 708 of first region 702, touch moved event 707-4 that corresponds to a location between first region 702 and second region 704, touch moved events 707-5 through 707-8 that correspond to second region 704, touch moved event 707-9 that corresponds to boundary region 708 of first region 702, and touch moved event 707-10 that corresponds to non-boundary region 706 of first region 702), and a touch ended event 707-11 that corresponds to non-boundary region 706 of first region 702.

FIG. 7F illustrates that, in response to touch events 707-1 through 707-11 (or the touch input that corresponds to touch events 707-1 through 707-11), first region 702 is updated. In FIG. 7F, one or more lines are displayed in the user interface of the drawing application shown in first region 702 along the path of the touch input that correspond to touch events 707-1 through 707-11.

When the touch input originates from non-boundary region 706 of first region 702, it is assumed that the user intends to interact with first region 702 using the touch input. Thus, even if the touch input leaves first region 702 and enters second region 704, second region 704 is not updated. In FIG. 7F, although touch events 707-5 through 707-8 correspond to second region 704, touch events 707-5 through 707-8 are not processed by the second application. Thus, FIG. 7F shows that second region 704 is not updated in response to touch events 707-1 through 707-11.

FIGS. 7G-7H illustrate an example of a touch input that begins in the region associated with a first application, and continues into the region associated with a second application, but due to the touch input beginning in a boundary region of the region associated with the first application and never entering a non-boundary region of the region associated with the first application, the touch input is construed by the device as inadvertently beginning outside the region associated with the application (i.e., the second application) with which the user intended to interact. As a result, touch events for the portion of the touch input that is in the boundary region of the first application are ignored or canceled, while touch events corresponding to the portion of the touch input that is in the region associated with the second application are delivered to the second application for processing. In this way, the user of the device can perform an edge gesture or the like with respect to the second application without having to avoid touching the region associated with the first application, so long as the user's touch input isn't so inaccurate that it enter a non-boundary region of the region associated with the first application.

More specifically, FIGS. 7G-7H illustrate touch events that correspond to a touch input that originates from boundary region 708 of first region 702 and extends to second region 704 in accordance with some embodiments. The touch events include a touch began event 709-1 that corresponds to non-boundary region 706 of first region 702, a touch moved event 709-2 that corresponds to non-boundary region 706 of first region 702, a touch cancel event 709-3 that corresponds to the right edge of non-boundary region 706 of first region 702, a touch began event 709-4 that corresponds to the left edge of second region 704, touch moved events 709-5 and 709-6 that correspond to second region 704, and a touch ended event 709-7 that correspond to second region 704.

The touch began event 709-1 is generated (e.g., by contact/motion module 130) in response to detecting an initial contact of the touch input with touch screen 112. The touch moved event 709-2 is generated (e.g., by contact/motion module 130) in response to detecting movement of the touch input. The touch cancel event 709-3 is generated (e.g., by contact/motion module 130) in response to detecting that the touch input is detected at a location that does not correspond to first region 702 (e.g., the touch input has left first region 702). The touch cancel event 709-3 is sent (e.g., by contact/motion module 130 and/or contact information distribution module 185) to the first application that corresponds to first region 702. In some embodiments, touch cancel event 709-3 initiates undoing operations triggered by the touch events that correspond to first region 702 (e.g., touch events 709-1 and 709-2) and/or forgoing processing of subsequent touch events (e.g., touch events 709-4 through 709-7) with the first software application that is associated with first region 702. The touch began event 709-4 is generated (e.g., by contact/motion module 130) in response to detecting that the touch input is detected at a location that corresponds to second region 704. The touch moved events 709-5 and 709-6 are generated (e.g., by contact/motion module 130) in response to detecting movement of the touch input. The touch ended event 709-6 is generated (e.g., by contact/motion module 130) in response to detecting a lift-off of the touch input.

FIG. 7H illustrates that, in response to touch events 709-1 through 709-7 (in particular, touch events 709-4 through 709-7), second region 704 is updated (e.g., the display of the particular web page is replaced with the display of the previous web page).

FIGS. 7I-7L also illustrate touch events that correspond to a touch input that originates from boundary region 708 of first region 702 and extends to second region 704 in accordance with some embodiments.

FIG. 7I illustrates touch events that correspond to a touch input that originates from boundary region 708 of first region 702 and extends toward second region 704. The touch events include a touch began event 709-1 and a touch moved event 709-2. In FIG. 7I, first region 702 is updated in accordance with touch events 709-1 and 709-2 (e.g., a line 712 is displayed in the user interface of the drawing application shown in first region 702 along the path of the touch input from a location that corresponds to touch event 709-1 to a location that corresponds to touch event 707-2).

FIG. 7J illustrates that additional touch events 709-3 through 709-7 are generated (e.g., by contact/motion module 130) in response to subsequent movement of the touch input (e.g., the touch input extending to second region 704). In response to the subsequent movement of the touch input (or corresponding touch events) toward the right edge of first region 702, line 712 is extended toward the edge of first region 702.

FIG. 7K illustrates the user interface 600 displayed in response to touch events 709-4 through 709-7 in accordance with some embodiments. In response to touch events 709-4 through 709-7, second region 704 is updated (e.g., the display of the particular web page is replaced with the display of the previous web page). In addition, line 712 remains in first region 702 (e.g., touch cancel event 709-3 causes multifunction device 100 to forgo updating first region 702 in accordance with subsequent touch events, such as touch events 709-4 through 709-7).

FIG. 7L illustrate an alternative user interface 600 displayed in response to touch events 709-4 through 709-7 in accordance with some embodiments. In response to touch events 709-4 through 709-7, second region 704 is updated (e.g., the display of the particular web page is replaced with the display of the previous web page), as illustrated in FIG. 7K. However, FIG. 7L differs from FIG. 7K in that line 712 ceases to be displayed (e.g., line 712 is removed in response to touch cancel event 709-3).

FIG. 7M illustrates touch events that correspond to a touch input that originates from boundary region 708 of first region 702, enters non-boundary region 706 of first region 702, and subsequently enters second region 704. The touch events include a touch began event 711-1 that corresponds to boundary region 708 of first region 702, touch moved events 711-2 through 711-5 that correspond to non-boundary region 706 of first region 702, touch moved events 711-6 and 711-7 that correspond to boundary region 708 of first region 702, touch moved events 711-8 through 711-12 that correspond to second region 704, touch moved events 711-13 and 711-14 that correspond to boundary region 708 of first region 702, and a touch ended event 711-15 that corresponds to boundary region 708 of first region 702.

FIG. 7M also illustrates that, in response to touch events 711-1 through 711-15, one or more lines are displayed in the user interface of the drawing application shown in first region 702 along the path of the touch input that correspond to touch events 711-1 through 711-15. In FIG. 7M, second region 704 is not updated in response to touch events 711-1 through 711-15.

FIGS. 7N-7S illustrate a touch input that originates from a location between first region 702 and second region 704 in accordance with some embodiments. It is noted that FIGS. 7N-7S illustrate examples of responses to touch inputs starting in third region 714, sometimes called a dead zone, between first region 702 and second 704, associated with first and second applications. In other embodiments, other actions may be performed by the device in response to touch inputs starting in third region 714 (e.g., touch gestures meeting predefined criteria).

FIG. 7N illustrates a touch event 713 (e.g., a touch began event) that corresponds to a touch input originating from a third region 714 between first region 702 and second region 704 and extending toward second region 704, as indicated by the arrow shown in FIG. 7N as starting in third region 714 and extending to the right into second region 704. Subsequent touch events, such as touch moved events and a touch ended event that correspond to second region 704, are omitted in FIG. 7N for brevity.

FIG. 7O illustrates the user interface 600 displayed in response to the touch input originating from the third region 714 and extending toward second region 704 (or corresponding touch events). Alternatively, first region 702 and/or second region 704 are resized in response to the touch input originating from the third region 714 and extending toward second region 704 (or corresponding touch events).

FIG. 7P illustrates an alternative user interface 600 displayed in response to the touch input originating from the third region 714 and extending toward second region 704 (or corresponding touch events). In FIG. 7P, second region 704 is resized and first region 702 remains unchanged (e.g., the size of first region 702 is not changed due to the touch input originating from the third region 714 and extending toward second region 704).

FIG. 7Q illustrates the user interface 600 that includes first region 702 and second region 704. FIG. 7Q also illustrates a touch event 715 (e.g., a touch began event) that corresponds to a touch input originating from the third region 714 between first region 702 and second region 704 and extending toward second region 704. Subsequent touch events, such as touch moved events and a touch ended event that correspond to second region 704, are omitted in FIG. 7N for brevity.

FIG. 7R illustrates the user interface 600 displayed in response to the touch input originating from the third region 714 and extending toward second region 704 (or corresponding touch events). In FIG. 7R, first region 702 and second region 704 are moved in accordance with the touch input (e.g., first region 702 and second region 704 are moved toward the right side of touch screen 112 in accordance with the touch input moving toward the right side of touch screen 112).

FIG. 7S illustrates an alternative user interface 600 displayed in response to the touch input originating from the third region 714 and extending toward second region 704 (or corresponding touch events). In FIG. 7S, second region 704 is moved in accordance with the touch input (e.g., second region 704 is moved toward the right side of touch screen 112 in accordance with the touch input moving toward the right side of touch screen 112) and first region 702 remains unchanged (e.g., the location of first region 702 is not changed due to the touch input originating from the third region 714 and extending toward second region 704).

FIG. 7T illustrates an example of user interface 600 in which first region 702 is in contact with second region 704. Thus, in FIG. 7T, the user interface 600 does not include the third region 714 between first region 702 and second region 704. Regardless, a touch input that originates from first region 702 and extends to second region 704 is processed in a manner analogous to those described above with respect to FIGS. 7B-7S. For brevity, such details are not repeated herein.

Although FIGS. 7B-7T illustrate operations associated with a touch input that originates from first region 702 (e.g., non-boundary region 706 or boundary region 708) and extends to second region 704, a touch input that originates from second region 704 and extends to first region 702 is processed in an analogous manner. Although not shown in FIGS. 7B-7T, second region 704 typically includes a non-boundary region and a boundary region, and a touch input that originates from second region 704 and extends to first region 702 is processed based on whether the touch input originates from the non-boundary region of second region 704 or the boundary region of second region 704, and optionally, whether the touch input has entered the non-boundary region of second region 704. For brevity, such details are omitted herein.

FIG. 7U illustrates multiple concurrent touch inputs detected on touch screen 112. In FIG. 7U, a touch began event 717 that corresponds to a touch input on first region 702 and touch began events 719 and 721 that correspond to touch inputs on second region 704 are concurrently detected on touch screen 112. Subsequent touch events, such as touch moved events and touch ended events, are omitted in FIG. 7U for brevity. The touch began event 717 and subsequent touch events that correspond to first region 702 are sent to, and processed by, the first software application that corresponds to first region 702 (e.g., a line is drawn in accordance with the touch input on first region 702 of touch screen 112). The touch began events 719 and 721 and subsequent touch events that correspond to second region 704 are sent to, and processed by, the second software application that corresponds to second region 704 (e.g., display of the particular web page is magnified in accordance with a de-pinch gesture represented by separating movements of a first touch input that corresponds to touch began event 719 and a second touch input that corresponds to touch began event 721).

Although FIGS. 7A-7U illustrate examples of user interface 600 with a region that corresponds to a drawing application and a region that corresponds to a web browser application, a person having ordinary skill in the art would understand that the methods illustrated in FIGS. 7A-7U can be applied with user interfaces with regions that correspond to different applications and/or different combinations of applications (e.g., the first region corresponds to a web browser application and the second region corresponds to a drawing application; the first region corresponds to a map application and the second region corresponds to an e-mail application; etc.). For example, when the second region corresponds to an e-mail application, an edge swipe gesture sent to the e-mail application initiates replacing displays (e.g., replacing display of an email with display of a list of emails, or replacing display of a list of emails with display of a list of email accounts). For brevity, such details are omitted herein.

FIGS. 8A-8D illustrate a flow diagram of a method 800 of processing touch inputs that move over multiple application user interfaces in accordance with some embodiments. Method 800 is performed at an electronic device (e.g., device 300, FIG. 3, or portable multifunction device 100, FIG. 1A) with a touch-sensitive display. In some embodiments, the display is not a touch-screen display and the touch-sensitive surface is not integrated with the display. Some operations in method 800 are, optionally, combined and/or the order of some operations is, optionally, changed.

As described below, method 800 provides an intuitive way to process touch inputs that move over multiple application user interfaces. The method reduces the cognitive burden on a user when processing touch inputs that move over multiple application user interfaces, thereby creating a more efficient human-machine interface. For battery-operated electronic devices, enabling a user to process touch inputs that move over multiple application user interfaces faster and more efficiently conserves power and increases the time between battery charges.

While displaying (802) a user interface (e.g., on the touch-sensitive display) that includes a first region that corresponds to a first software application and a second region that corresponds to a second software application that is distinct from the first software application (e.g., regions 702 and 704 in FIG. 7A), the device receives (804) a first touch input, on the touch-sensitive display, that originates from a first location on the touch-sensitive display that corresponds to the first region of the user interface and extends to a second location on the touch-sensitive display that corresponds to the second region of the user interface. In some embodiments, the second region is displayed adjacent to the first region in the user interface. For example, as shown in FIG. 7E, the device receives a touch input represented by touch events 707 and originating with touch began event 707-1, corresponding to a location in first region 702 of user interface 600. In this example, the touch input includes one or more touch events (e.g., touch event 707-6) in second region 704 of user interface 600.

In response to receiving the first touch input, in accordance with a determination that the first location corresponds to a non-boundary region of the first region (e.g., the non-boundary region of the first region is included in the first region and located away from the second region in the user interface), the device processes (806) the first touch input with the first software application. For example, as shown in FIG. 7E, first region 702 includes non-boundary region 706 and boundary region 708. In FIG. 7F, the first touch input (e.g., comprising touch events 707), originates from a location, that corresponds to touch event 707-1, in non-boundary region 706 of first region 702, and correspondingly, the touch input is processed by the first software application (e.g., a drawing application), corresponding to region 702. In this example, a line is drawn in the drawing application, for the portions of the touch input detected within region 702. In some embodiments, the non-boundary region is a remaining region of the first region excluding the boundary region.

In accordance with a determination that the first location corresponds to a boundary region of the first region (e.g., the boundary region of the first region is included in the first region and located between the non-boundary portion of the first region and the second region in the user interface), the device conditionally processes (808) the first touch input with the second software application. For example, as shown in FIG. 7G, the device receives a touch input represented by touch events 709. The touch input originates from a location that corresponds to touch began event 709-1, in boundary region 708 of first region 702. In this example, the touch input progresses into second region 704 (e.g., as shown by at least touch event 709-7). FIG. 7H shows responsive behavior of the software application that corresponds to region 704. For example, the software application that corresponds to region 704 is a web browser application and the responsive behavior to detecting the touch input of FIG. 7G, is to display a previously viewed web page. In some embodiments, the boundary region is not visually distinguished from the first region. In some embodiments, the boundary region vertically extends from a top of the first region toward (or to) a bottom of the first region. In some embodiments, the boundary region has a predefined width (e.g., 2, 3, 5, 10, 15, or 20% of the width of the first region or a predefined number of pixels).

In some embodiments, in response to receiving the first touch input and in accordance with the determination that the first location corresponds to the boundary region of the first region and that the first touch input has not entered the non-boundary region of the first region on the touch-sensitive display (e.g., since being detected, the first touch input has never moved into the non-boundary region of the first region), the device processes (810) the first touch input with the second software application. For example, as shown in FIGS. 7G and 7H, the touch input represented by touch events 709 originates from a location in boundary region 708 of first region 702, and does not enter non-boundary region 706 of region 702. In this example, FIG. 7H illustrates processing of this touch input with the second software application (e.g., a web browser application), corresponding to region 704.

In some embodiments, in response to receiving the first touch input and in accordance with a determination that the first location corresponds to the boundary region of the first region and that the first touch input has entered the non-boundary region of the first region on the touch-sensitive display, the device processes (812) the first touch input with the first software application. For example, as illustrated in FIG. 7M, the touch input represented by touch events 711, originates from a location in boundary region 708 of first region 702 (e.g., a location that corresponds to touch event 711-1), enters non-boundary region 706 (e.g., as seen at least by a location that corresponds to touch event 711-4), and the touch input is processed by the first software application. Optionally, the device prevents the first touch input from being processed by the second software application (e.g., even if the first touch input moves into the second region, the first touch input continues to be processed by the first software application). For example, in FIG. 7M, although the touch input subsequently moves to second region 704, the touch input is not processed by the second software application (e.g., touch events at locations that correspond to second region 704, such as touch events 711-8 through 711-12, do not initiate updating the user interface in second region 704).

In some embodiments, in response to detecting the first touch input at the first location on the touch-sensitive display, the device sends (814, FIG. 8B) a touch began event to the first software application. In some embodiments, subsequent to sending the touch began event to the first software application and in response to detecting the first touch input at a third location on the touch-sensitive display that corresponds to the second region of the user interface, the device sends (816) a touch cancel event to the first software application and sends a touch began event to the second software application. For example, FIG. 7G illustrates that the device sends touch began event 709-1 to the first software application (e.g., a drawing application), and subsequently, in response to detecting the touch input at a location that corresponds to second region 704, sends a touch cancel event 709-3 to the first software application (e.g., a drawing application) and a touch began event 709-4 to the second software application (e.g., a web browser application). Because the touch cancel event is not sent to the first software application until the first touch input is detected at the third location that corresponds to the second region of the user interface in these embodiments, the device forgoes generating a touch cancel event when the touch input leaves the first region (as long as the touch input does not enter the second region). In some embodiments, the touch began event sent to the second software application is identified as a "touch began" event of a new touch. In some embodiments, the touch began event sent to the second software application is identified as a "touch began" event of the same touch.

In some embodiments, in response to detecting the first touch input at the first location on the touch-sensitive display, the device sends (814) a touch began event to the first software application. In some embodiments, subsequent to sending the touch began event to the first software application, in response to detecting that the first touch input has left the first region of the user interface on the touch-sensitive display, the device sends (818) a touch cancel event to the first software application, and in response to detecting that the first touch input has entered the second region of the user interface on the touch-sensitive display, sends a touch began event to the second software application. For example, FIG. 7G illustrates that the device sends touch began event 709-1 to the first software application (e.g., a drawing application), and subsequently, in response to detecting the touch input leaving first region 702, sends a touch cancel event 709-3 to the first software application and, in response to detecting the touch input entering second region 704, sends a touch began event 709-4 to the second software application.

In some embodiments, the touch began event sent to the second software application includes (820) information identifying the touch began event as an edge touch event (e.g., touch began event 709-4 in FIG. 7J is an edge touch event). In some embodiments, a touch event object (e.g., a data structure that includes information for a touch event) includes an edge property that indicates whether a corresponding touch event is an edge touch event, and the edge property of the touch event object is set to indicate that the corresponding touch event is an edge touch event. In some embodiments, the first touch input, which causes the touch began event (that is identified as an edge event or edge swipe event) to be sent to the second software application, initiates replacing display of a first page (e.g., a current page) with a second page (e.g., a previous page)(e.g., in a web browser). In some embodiments, the edge swipe event is interpreted by the second application as an event that occurs when a touch contact moves onto the touch-screen display from an edge of the device. Thus, even though the first touch input is moving across a virtual edge in on the device, the second application is instructed to interpret the first touch input as an edge swipe input (e.g., as though it had appeared from an edge of the device).

In some embodiments, the touch cancel event is sent (822) from a third software application that is distinct (and in some embodiments, separate) from the first software application and the second software application. For example, contact information distribution module 185 (FIG. 1A) that is distinct from the first software application (e.g., the drawing module 175) and the second software application (e.g., the browser module 147) sends the touch cancel event to the first software application (e.g., the drawing module 175) and/or the second software application (e.g., the browser module 147).

In some embodiments, the user interface includes (824, FIG. 8C) a third region (e.g., third region 714 in FIG. 7N), that is distinct from the first region and the second region (e.g., first region 702 and second region 704), between the first region and the second region. In some embodiments, the third region is also called herein a dead zone.

In some embodiments, the device receives (826) a second touch input (e.g., an edge move gesture), on the touch-sensitive display, that is distinct and separate from the first touch input and originates from a location on the touch-sensitive display that corresponds to the third region and moves toward a location on the touch-sensitive display that corresponds to the first region or the second region of the user interface. In some embodiments, in response to receiving the second touch input, the device moves a boundary of the first region adjacent to the third region (e.g., the boundary of the first region that is in contact with the third region) in accordance with the second touch input, and/or moves a boundary of the second region adjacent to the third region (e.g., the boundary of the second region that is in contact with the third region) in accordance with the second touch input. For example, FIG. 7N illustrates detection of touch input 713 that originates from third region 714 of user interface 600. In this example, touch input 713 moves toward second region 704. FIG. 7O illustrates movement of a boundary of first region 702 and a boundary of second region 704 in response to receiving touch input 713 that moves toward second region 704. In some embodiments, in response to receiving the second touch input, the device moves a boundary of the first region adjacent to the third region in accordance with the second touch input without moving a boundary of the second region adjacent to the third region in accordance with the second touch input. In some embodiments, in response to receiving the second touch input, the device moves a boundary of the second region adjacent to the third region in accordance with the second touch input without moving a boundary of the first region adjacent to the third region in accordance with the second touch input. For example, in FIG. 7P, the boundary of second region 704 adjacent to third region 714 has moved without moving the boundary of first region 702 adjacent to third region 714. In some embodiments, moving the boundary of the first region adjacent to the third region in accordance with the second touch input includes resizing the first region in accordance with the second touch input, or alternatively, moving the first region in accordance with the second touch input. In some embodiments, moving the boundary of the second region adjacent to the third region in accordance with the second touch input includes resizing the second region in accordance with the second touch input (e.g., as shown in FIG. 7P), or alternatively, moving the second region in accordance with the second touch input (e.g., as shown in FIGS. 7R and 7S).

In some embodiments, the device receives a second touch input, on the touch-sensitive display, that is distinct and separate from the first touch input and originates from an edge handle location on the touch-sensitive display that corresponds to an edge of first or second region and moves toward a location on the touch-sensitive display that corresponds to the first region or the second region of the user interface; and, in response to receiving the second touch input, the device moves a boundary of the first region adjacent to the third region in accordance with the second touch input, and/or moves a boundary of the second region adjacent to the third region in accordance with the second touch input.

In some embodiments, while displaying the user interface, the device receives (828) multiple concurrent touch inputs, on the touch-sensitive display, that include one or more touch inputs in the first region of the user interface and one or more touch inputs in the second region of the user interface. For example, FIG. 7U illustrates a touch input that corresponds to a touch began event 717, detected in first region 702, and additional touch inputs that correspond to touch began events 719 and 721, detected in second region 704. In response to receiving the multiple concurrent touch inputs, the device processes (830) the multiple concurrent touch inputs that include the one or more touch inputs in the first region and the one or more touch inputs in the second region with a third software application (e.g., contact information distribution module 185 in FIG. 1A) that is distinct from the first software application and the second software application, sends one or more touch events that correspond to the one or more touch inputs in the first region of the user interface to the first software application, and sends one or more touch events that correspond to the one or more touch inputs in the second region of the user interface to the second software application. For example, the third software application sends touch began event 717 to the first software application (e.g., a drawing application) and touch began events 719 and 721 to the second software application (e.g., a web browser application). In some embodiments, sending one or more touch events that correspond to the one or more touch inputs in the first region of the user interface to the first software application includes forgoing sending one or more touch events that correspond to the one or more touch inputs in the first region of the user interface to the second software application. In some embodiments, sending one or more touch events that correspond to the one or more touch inputs in the second region of the user interface to the second software application includes forgoing sending one or more touch events that correspond to the one or more touch inputs in the second region of the user interface to the first software application. In some embodiments, the third software application is configured to perform multiple operations, such as generating touch events, changing coordinates of raw touch inputs to application specific coordinates, etc. (e.g., in conjunction with contact/motion module 130 in FIG. 1A).

In some embodiments, prior to detecting that the first touch input has entered the second region of the user interface on the touch-sensitive display, the device processes (832) the first touch input with the first software application. For example, as illustrated in FIG. 7I, the touch input represented by touch events 709 is detected in first region 702, and is processed by the first application corresponding to first region 702 (e.g., a line is drawn for the detected portion of the touch input within region 702). In some embodiments, prior to detecting that the first touch input has left the first region of the user interface on the touch-sensitive display, the device processes the first touch input with the first software application.

In some embodiments, processing the first touch input with the first software application includes (834) updating the first region of the user interface in accordance with the first touch input (e.g., displaying one or more user interface objects, such as a pen stroke 712, in first region 702 of the user interface as shown in FIG. 7I).

In some embodiments, in response to detecting that the first touch input has entered the second region of the user interface on the touch-sensitive display, the device undoes (836) the update to the first region of the user interface, made prior to detecting that the first touch input has entered the second region of the user interface on the touch-sensitive display. In some embodiments, updating the first region of the user interface in accordance with the first touch input includes displaying one or more user interface objects, such as a pen stroke, in the first region of the user interface in accordance with the first touch input, and undoing the update includes ceasing to display (e.g., removing from the touch-sensitive display) the one or more user interface objects in the first region of the user interface. For example, FIG. 7L illustrates the device undoing the update to first region 702 of user interface 600 (e.g., deleting the drawn line shown in FIG. 7K) in accordance with the touch input represented by touch events 709, as shown earlier in FIGS. 7I and 7J. In some embodiments, updating the first region of the user interface in accordance with the first touch input includes scrolling content displayed in the first region of the user interface (e.g., without scrolling the second region of the user interface), and undoing the update to the first region of the user interface includes scrolling back the content displayed in the first region of the user interface.

In some embodiments, in response to detecting that the first touch input has entered the second region of the user interface on the touch-sensitive display, the device ceases (838) to further update the first region of the user interface in accordance with the first touch input while the first touch input is detected in the second region of the user interface. As a result, the first region of the user interface does not change further in response to the first touch input. In some embodiments, the first region of the user interface does not change further in response to the first touch input while the first touch input is in the second region of the user interface. For example, FIGS. 7J and 7K illustrate the device ceasing to further update first region 702 of user interface 600 in accordance with the touch input represented by touch events 709, while touch events 709 are detected in region 704.

It should be understood that the particular order in which the operations in FIGS. 8A-8D have been described is merely exemplary and is not intended to indicate that the described order is the only order in which the operations could be performed. One of ordinary skill in the art would recognize various ways to reorder the operations described herein. For brevity, these details are not repeated here.

Figure 9:
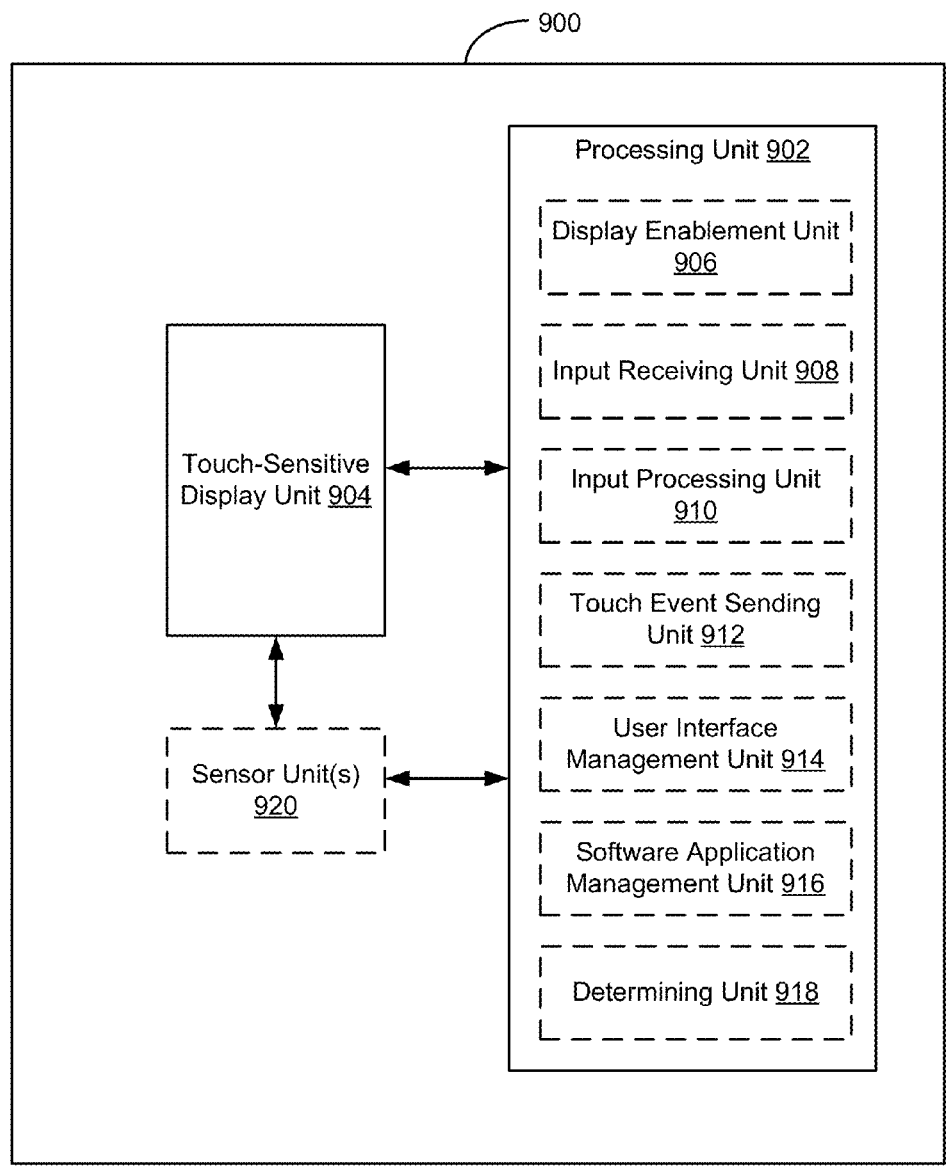
FIG. 9 is a functional block diagram of an electronic device in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a touch-sensitive display unit 904 configured to display a user interface and receive contacts, and a processing unit 902 coupled with the touch-sensitive display unit 904. In some embodiments, the processing unit 902 includes: a display enablement unit 906, an input receiving unit 908, an input processing unit 910, a touch event sending unit 912, a user management unit 914, a software application management unit 916, and a determining unit 918. In some embodiments, the electronic device 900 also includes one or more sensor units 920 that are configured to generate sensor signals and are coupled with the processing unit 902 and the touch-sensitive display unit 904. In some embodiments, the one or more sensor units 920 include one or more sensors unit to detect signals from a stylus associated with the electronic device. In some embodiments, the one or more sensor units 920 include one or more sensor units configured to detect intensity of contacts with the touch-sensitive display unit 904.

The processing unit 902 is configured to: while enabling display (e.g., with display enablement unit 906 and/or touch-sensitive display unit 904) of a user interface that includes a first region that corresponds to a first software application and a second region that corresponds to a second software application that is distinct from the first software application, receive a first touch input (e.g., with input receiving unit 908 and/or touch-sensitive display unit 904), from the touch-sensitive display unit 904, that originates from a first location on the touch-sensitive display unit 904 that corresponds to the first region of the user interface and extends to a second location on the touch-sensitive display unit 904 that corresponds to the second region of the user interface; and, in response to receiving the first touch input: in accordance with a determination that the first location corresponds to a non-boundary region of the first region (e.g., with determining unit 918), process the first touch input (e.g., with input processing unit 910) with the first software application (e.g., selected with software application management unit 916), wherein the non-boundary region of the first region is included in the first region and located away from the second region in the user interface; and in accordance with a determination that the first location corresponds to a boundary region of the first region (e.g., with determining unit 918), conditionally process the first touch input (e.g., with input processing unit 910) with the second software application (e.g., selected with software application management unit 916), wherein the boundary region of the first region is included in the first region and located between the non-boundary portion of the first region and the second region in the user interface.

In some embodiments, the processing unit 902 is further configured to: in response to receiving the first touch input (e.g., with input receiving unit 908 and/or touch-sensitive display unit 904) and in accordance with the determination that the first location corresponds to the boundary region of the first region and that the first touch input has not entered the non-boundary region of the first region on the touch-sensitive display unit 904 (e.g., with determining unit 918), process the first touch input (e.g., with input processing unit 910 and/or touch-sensitive display unit 904) with the second software application (e.g., selected with software application management unit 916).

In some embodiments, the processing unit 902 is further configured to: in response to receiving the first touch input (e.g., with input receiving unit 908 and/or touch-sensitive display unit 904) and in accordance with a determination that the first location corresponds to the boundary region of the first region and that the first touch input has entered the non-boundary region of the first region on the touch-sensitive display unit 904 (e.g., with determining unit 918), process the first touch input (e.g., with input processing unit 910) with the first software application (e.g., selected with software application management unit 916).

In some embodiments, the processing unit 902 is further configured to: in response to detecting the first touch input (e.g., with input receiving unit 908 and/or touch-sensitive display unit 904) at the first location on the touch-sensitive display unit 904, send a touch began event to the first software application (e.g., with touch event sending unit 912 and/or software application management unit 916), and subsequent to sending the touch began event to the first software application and in response to detecting the first touch input at a third location on the touch-sensitive display unit 904 that corresponds to the second region of the user interface: send a touch cancel event to the first software application (e.g., with touch event sending unit 912 and/or software application management unit 916) and send a touch began event to the second software application (e.g., with touch event sending unit 912 and/or software application management unit 916).

In some embodiments, the processing unit 902 is further configured to: in response to detecting the first touch input (e.g., with input receiving unit 908 and/or touch-sensitive display unit 904) at the first location on the touch-sensitive display unit 904, send a touch began event to the first software application (e.g., with touch event sending unit 912 and/or software application management unit 916), and subsequent to sending the touch began event to the first software application: in response to detecting that the first touch input has left the first region (e.g., with input receiving unit 908 and/or touch-sensitive display unit 904) of the user interface on the touch-sensitive display unit 904, send a touch cancel event to the first software application (e.g., with touch event sending unit 912 and/or software application management unit 916); and, in response to detecting that the first touch input has entered the second region (e.g., with input receiving unit 908 and/or touch-sensitive display unit 904) of the user interface on the touch-sensitive display unit 904, send a touch began event to the second software application (e.g., with touch event sending unit 912 and/or software application management unit 916).

In some embodiments, the touch began event sent to the second software application (e.g., with touch event sending unit 912 and/or software application management unit 916) includes information identifying the touch began event as an edge touch event. In some embodiments, a touch cancel event is sent from a third software application (e.g., with touch event sending unit 912 and/or software application management unit 916) that is distinct from the first software application and the second software application.

In some embodiments, the user interface includes a third region, that is distinct from the first region and the second region, between the first region and the second region.

In some embodiments, the processing unit 902 is further configured to: receive a second touch input (e.g., with input receiving unit 908 and/or touch-sensitive display unit 904), from the touch-sensitive display unit 904, that is distinct and separate from the first touch input and originates from a location on the touch-sensitive display unit 904 that corresponds to the third region and moves toward a location on the touch-sensitive display unit 904 that corresponds to the first region or the second region of the user interface; and, in response to receiving the second touch input: move a boundary of the first region adjacent to the third region (e.g., with user interface management unit 914 and/or touch-sensitive display unit 904) in accordance with the second touch input; and/or move a boundary of the second region (e.g., with user interface management unit 914 and/or touch-sensitive display unit 904) adjacent to the third region in accordance with the second touch input.

In some embodiments, the processing unit 902 is further configured to: while enabling display of the user interface: receive multiple concurrent touch inputs (e.g., with input receiving unit 908 and/or touch-sensitive display unit 904), on the touch-sensitive display unit 904, that include one or more touch inputs in the first region of the user interface and one or more touch inputs in the second region of the user interface; and in response to receiving the multiple concurrent touch inputs: process the multiple concurrent touch inputs (e.g., with input processing unit 910) that include the one or more touch inputs in the first region and the one or more touch inputs in the second region with a third software application that is distinct from the first software application and the second software application; send one or more touch events (e.g., with touch event sending unit 912 and/or software application management unit 916) that correspond to the one or more touch inputs in the first region of the user interface to the first software application; and send one or more touch events (e.g., with touch event sending unit 912 and/or software application management unit 916) that correspond to the one or more touch inputs in the second region of the user interface to the second software application.

In some embodiments, the processing unit 902 is further configured to: prior to detecting that the first touch input has entered the second region of the user interface on the touch-sensitive display unit 904, process the first touch input (e.g., with input processing unit 910) with the first software application (e.g., selected with software application management unit 916). In some embodiments, processing the first touch input with the first software application (e.g., with input processing unit 910 and/or software application management unit 916) includes updating the first region of the user interface in accordance with the first touch input (e.g., with display enablement unit 906 and/or user interface management unit 914).

In some embodiments, the processing unit 902 is further configured to: in response to detecting that the first touch input has entered the second region of the user interface on the touch-sensitive display unit 904 (e.g., with input receiving unit 908, touch-sensitive display unit 904, and/or determining unit 918), undo the update to the first region of the user interface (e.g., with display enablement unit 906 and/or user interface management unit 914), made prior to detecting that the first touch input has entered the second region of the user interface on the touch-sensitive display unit 904 (e.g., with input receiving unit 908, touch-sensitive display unit 904, and/or determining unit 918).

In some embodiments, the processing unit 902 is further configured to: in response to detecting that the first touch input has entered the second region of the user interface on the touch-sensitive display unit 904 (e.g., with input receiving unit 908 and/or touch-sensitive display unit 904), cease to further update the first region of the user interface (e.g., with display enablement unit 906 and/or user interface management unit 914) in accordance with the first touch input while the first touch input is detected in the second region of the user interface (e.g., with input receiving unit 908 and/or touch-sensitive display unit 904).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8D are, optionally, implemented by components depicted in FIGS. 1A-1B or FIG. 9. For example, input receiving operation 804, input processing operation 806, and touch event sending operation 814 are, optionally, implemented by event sorter 170, event recognizer 180, and event handler 180. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 180 associated with the detection of the event or sub-event. Event handler 180 optionally uses or calls data updater 176 or object updater 177 to update the application internal state 182. In some embodiments, event handler 180 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a touch-sensitive display:
      while displaying a user interface that includes a first region that corresponds to a first software application and a second region that corresponds to a second software application that is distinct from the first software application:
      receiving a first touch input, on the touch-sensitive display, that originates from a first location on the touch-sensitive display that corresponds to the first region of the user interface and extends to a second location on the touch-sensitive display that corresponds to the second region of the user interface; and,
      in response to receiving the first touch input:
         in accordance with a determination that the first location corresponds to a non-boundary region of the first region, processing the first touch input with the first software application, wherein the non-boundary region of the first region is included in the first region and located away from the second region in the user interface; and,
         in accordance with a determination that the first location corresponds to a boundary region of the first region, conditionally processing the first touch input with the second software application, wherein the boundary region of the first region is included in the first region and located between the non-boundary region of the first region and the second region in the user interface.

2. The method of claim 1, including:
   in response to receiving the first touch input and in accordance with the determination that the first location corresponds to the boundary region of the first region and that the first touch input has not entered the non-boundary region of the first region on the touch-sensitive display, processing the first touch input with the second software application.

3. The method of claim 1, including:
   in response to receiving the first touch input and in accordance with a determination that the first location corresponds to the boundary region of the first region and that the first touch input has entered the non-boundary region of the first region on the touch-sensitive display, processing the first touch input with the first software application.

4. The method of claim 1, including:
   in response to detecting the first touch input at the first location on the touch-sensitive display, sending a touch began event to the first software application; and,
   subsequent to sending the touch began event to the first software application and in response to detecting the first touch input at a third location on the touch-sensitive display that corresponds to the second region of the user interface:
      sending a touch cancel event to the first software application; and
      sending a touch began event to the second software application.

5. The method of claim 1, including:
   in response to detecting the first touch input at the first location on the touch-sensitive display, sending a touch began event to the first software application; and,
   subsequent to sending the touch began event to the first software application:
      in response to detecting that the first touch input has left the first region of the user interface on the touch-sensitive display, sending a touch cancel event to the first software application; and,
      in response to detecting that the first touch input has entered the second region of the user interface on the touch-sensitive display, sending a touch began event to the second software application.

6. The method of claim 4, wherein the touch began event sent to the second software application includes information identifying the touch began event as an edge touch event.

7. The method of claim 4, wherein the touch cancel event is sent from a third software application that is distinct from the first software application and the second software application.

8. The method of claim 1, wherein the user interface includes a third region, that is distinct from the first region and the second region, between the first region and the second region.

9. The method of claim 8, including:
receiving a second touch input, on the touch-sensitive display, that is distinct and separate from the first touch input and originates from a location on the touch-sensitive display that corresponds to the third region and moves toward a location on the touch-sensitive display that corresponds to the first region or the second region of the user interface; and,
in response to receiving the second touch input:
moving a boundary of the first region adjacent to the third region in accordance with the second touch input; and/or
moving a boundary of the second region adjacent to the third region in accordance with the second touch input.

10. The method of claim 1, further comprising:
while displaying the user interface:
receiving multiple concurrent touch inputs, on the touch-sensitive display, that include one or more touch inputs in the first region of the user interface and one or more touch inputs in the second region of the user interface; and,
in response to receiving the multiple concurrent touch inputs:
processing the multiple concurrent touch inputs that include the one or more touch inputs in the first region and the one or more touch inputs in the second region with a third software application that is distinct from the first software application and the second software application;
sending one or more touch events that correspond to the one or more touch inputs in the first region of the user interface to the first software application; and
sending one or more touch events that correspond to the one or more touch inputs in the second region of the user interface to the second software application.

11. The method of claim 1, including:
prior to detecting that the first touch input has entered the second region of the user interface on the touch-sensitive display, processing the first touch input with the first software application.

12. The method of claim 11, wherein:
processing the first touch input with the first software application includes updating the first region of the user interface in accordance with the first touch input.

13. The method of claim 12, further including:
in response to detecting that the first touch input has entered the second region of the user interface on the touch-sensitive display, undoing the update to the first region of the user interface, made prior to detecting that the first touch input has entered the second region of the user interface on the touch-sensitive display.

14. The method of claim 12, further including:
in response to detecting that the first touch input has entered the second region of the user interface on the touch-sensitive display, ceasing to further update the first region of the user interface in accordance with the first touch input while the first touch input is detected in the second region of the user interface.

15. An electronic device, comprising:
a touch-sensitive display;
one or more processors;
memory; and
one or more programs, wherein the one or more programs are stored in the memory and configured to be executed by the one or more processors, the one or more programs including instructions for:
while displaying a user interface that includes a first region that corresponds to a first software application and a second region that corresponds to a second software application that is distinct from the first software application:
receiving a first touch input, on the touch-sensitive display, that originates from a first location on the touch-sensitive display that corresponds to the first region of the user interface and extends to a second location on the touch-sensitive display that corresponds to the second region of the user interface; and,
in response to receiving the first touch input:
in accordance with a determination that the first location corresponds to a non-boundary region of the first region, processing the first touch input with the first software application, wherein the non-boundary region of the first region is included in the first region and located away from the second region in the user interface; and,
in accordance with a determination that the first location corresponds to a boundary region of the first region, conditionally processing the first touch input with the second software application, wherein the boundary region of the first region is included in the first region and located between the non-boundary region portion of the first region and the second region in the user interface.

16. A non-transitory computer readable storage medium storing one or more programs, the one or more programs comprising instructions, which, when executed by an electronic device with a touch-sensitive display, cause the device to:
while displaying a user interface that includes a first region that corresponds to a first software application and a second region that corresponds to a second software application that is distinct from the first software application:
receive a first touch input, on the touch-sensitive display, that originates from a first location on the touch-sensitive display that corresponds to the first region of the user interface and extends to a second location on the touch-sensitive display that corresponds to the second region of the user interface; and,
in response to receiving the first touch input:
in accordance with a determination that the first location corresponds to a non-boundary region of the first region, process the first touch input with the first software application, wherein the non-boundary region of the first region is included in the first region and located away from the second region in the user interface; and,
in accordance with a determination that the first location corresponds to a boundary region of the first region, conditionally process the first touch input with the second software application, wherein the boundary region of the first region is included in the first region and located between the non-boundary region of the first region and the second region in the user interface.

17. The non-transitory computer readable storage medium of claim 16, wherein the instructions in the one or more programs include instructions, which, when executed by an electronic device with a touch-sensitive display, cause the device to:
in response to receiving the first touch input and in accordance with the determination that the first location corresponds to the boundary region of the first region and that the first touch input has not entered the non-boundary region of the first region on the touch-sensitive display, process the first touch input with the second software application.

18. The non-transitory computer readable storage medium of claim 16, wherein the instructions in the one or more programs include instructions, which, when executed by an electronic device with a touch-sensitive display, cause the device to:
in response to receiving the first touch input and in accordance with a determination that the first location corresponds to the boundary region of the first region and that the first touch input has entered the non-boundary region of the first region on the touch-sensitive display, process the first touch input with the first software application.

19. The non-transitory computer readable storage medium of claim 16, wherein the instructions in the one or more programs include instructions, which, when executed by an electronic device with a touch-sensitive display, cause the device to:
in response to detecting the first touch input at the first location on the touch-sensitive display, send a touch began event to the first software application; and,
subsequent to sending the touch began event to the first software application and in response to detecting the first touch input at a third location on the touch-sensitive display that corresponds to the second region of the user interface:
send a touch cancel event to the first software application; and
send a touch began event to the second software application.

20. The non-transitory computer readable storage medium of claim 16, wherein the instructions in the one or more programs include instructions, which, when executed by an electronic device with a touch-sensitive display, cause the device to:
in response to detecting the first touch input at the first location on the touch-sensitive display, send a touch began event to the first software application; and,
subsequent to sending the touch began event to the first software application:
in response to detecting that the first touch input has left the first region of the user interface on the touch-sensitive display, send a touch cancel event to the first software application; and,
in response to detecting that the first touch input has entered the second region of the user interface on the touch-sensitive display, send a touch began event to the second software application.

21. The non-transitory computer readable storage medium of claim 19, wherein the touch began event sent to the second software application includes information identifying the touch began event as an edge touch event.

22. The non-transitory computer readable storage medium of claim 19, wherein the touch cancel event is sent from a third software application that is distinct from the first software application and the second software application.

23. The non-transitory computer readable storage medium of claim 16, wherein the user interface includes a third region, that is distinct from the first region and the second region, between the first region and the second region.

24. The non-transitory computer readable storage medium of claim 23, wherein the instructions in the one or more programs include instructions, which, when executed by an electronic device with a touch-sensitive display, cause the device to:
receive a second touch input, on the touch-sensitive display, that is distinct and separate from the first touch input and originates from a location on the touch-sensitive display that corresponds to the third region and moves toward a location on the touch- sensitive display that corresponds to the first region or the second region of the user interface; and,
in response to receiving the second touch input:
move a boundary of the first region adjacent to the third region in accordance with the second touch input; and/or
move a boundary of the second region adjacent to the third region in accordance with the second touch input.

25. The non-transitory computer readable storage medium of claim 16, wherein the instructions in the one or more programs include instructions, which, when executed by an electronic device with a touch-sensitive display, cause the device to:
while displaying the user interface:
receive multiple concurrent touch inputs, on the touch-sensitive display, that include one or more touch inputs in the first region of the user interface and one or more touch inputs in the second region of the user interface; and,
in response to receiving the multiple concurrent touch inputs:
process the multiple concurrent touch inputs that include the one or more touch inputs in the first region and the one or more touch inputs in the second region with a third software application that is distinct from the first software application and the second software application;
send one or more touch events that correspond to the one or more touch inputs in the first region of the user interface to the first software application; and
send one or more touch events that correspond to the one or more touch inputs in the second region of the user interface to the second software application.

26. The non-transitory computer readable storage medium of claim 16, wherein the instructions in the one or more programs include instructions, which, when executed by an electronic device with a touch-sensitive display, cause the device to:

prior to detecting that the first touch input has entered the second region of the user interface on the touch-sensitive display, process the first touch input with the first software application.

27. The non-transitory computer readable storage medium of claim 26, wherein:
processing the first touch input with the first software application includes updating the first region of the user interface in accordance with the first touch input.

28. The non-transitory computer readable storage medium of claim 27, wherein the instructions in the one or more programs include instructions, which, when executed by an electronic device with a touch-sensitive display, cause the device to:
in response to detecting that the first touch input has entered the second region of the user interface on the touch-sensitive display, undo the update to the first region of the user interface, made prior to detecting that the first touch input has entered the second region of the user interface on the touch-sensitive display.

29. The non-transitory computer readable storage medium of claim 27, wherein the instructions in the one or more programs include instructions, which, when executed by an electronic device with a touch-sensitive display, cause the device to:
in response to detecting that the first touch input has entered the second region of the user interface on the touch-sensitive display, cease to further update the first region of the user interface in accordance with the first touch input while the first touch input is detected in the second region of the user interface.

30. The electronic device of claim 15, wherein the one or more programs include instructions for:
in response to receiving the first touch input and in accordance with the determination that the first location corresponds to the boundary region of the first region and that the first touch input has not entered the non-boundary region of the first region on the touch-sensitive display, processing the first touch input with the second software application.

31. The electronic device of claim 15, wherein the one or more programs include instructions for:
in response to receiving the first touch input and in accordance with a determination that the first location corresponds to the boundary region of the first region and that the first touch input has entered the non-boundary region of the first region on the touch-sensitive display, processing the first touch input with the first software application.

32. The electronic device of claim 15, wherein the one or more programs include instructions for:
in response to detecting the first touch input at the first location on the touch-sensitive display, sending a touch began event to the first software application; and,
subsequent to sending the touch began event to the first software application and in response to detecting the first touch input at a third location on the touch-sensitive display that corresponds to the second region of the user interface:
sending a touch cancel event to the first software application; and
sending a touch began event to the second software application.

33. The electronic device of claim 15, wherein the one or more programs include instructions for:
in response to detecting the first touch input at the first location on the touch-sensitive display, sending a touch began event to the first software application; and,
subsequent to sending the touch began event to the first software application:
in response to detecting that the first touch input has left the first region of the user interface on the touch-sensitive display, sending a touch cancel event to the first software application; and,
in response to detecting that the first touch input has entered the second region of the user interface on the touch-sensitive display, sending a touch began event to the second software application.

34. The electronic device of claim 32, wherein the touch began event sent to the second software application includes information identifying the touch began event as an edge touch event.

35. The electronic device of claim 32, wherein the touch cancel event is sent from a third software application that is distinct from the first software application and the second software application.

36. The electronic device of claim 15, wherein the user interface includes a third region, that is distinct from the first region and the second region, between the first region and the second region.

37. The electronic device of claim 36, wherein the one or more programs include instructions for:
receiving a second touch input, on the touch-sensitive display, that is distinct and separate from the first touch input and originates from a location on the touch-sensitive display that corresponds to the third region and moves toward a location on the touch-sensitive display that corresponds to the first region or the second region of the user interface; and,
in response to receiving the second touch input:
moving a boundary of the first region adjacent to the third region in accordance with the second touch input; and/or
moving a boundary of the second region adjacent to the third region in accordance with the second touch input.

38. The electronic device of claim 15, wherein the one or more programs include instructions for:
while displaying the user interface:
receiving multiple concurrent touch inputs, on the touch-sensitive display, that include one or more touch inputs in the first region of the user interface and one or more touch inputs in the second region of the user interface; and,
in response to receiving the multiple concurrent touch inputs:
processing the multiple concurrent touch inputs that include the one or more touch inputs in the first region and the one or more touch inputs in the second region with a third software application that is distinct from the first software application and the second software application;
sending one or more touch events that correspond to the one or more touch inputs in the first region of the user interface to the first software application; and
sending one or more touch events that correspond to the one or more touch inputs in the second region of the user interface to the second software application.

39. The electronic device of claim 15, wherein the one or more programs include instructions for:

prior to detecting that the first touch input has entered the second region of the user interface on the touch-sensitive display, processing the first touch input with the first software application.

40. The electronic device of claim 39, wherein:
processing the first touch input with the first software application includes updating the first region of the user interface in accordance with the first touch input.

41. The electronic device of claim 40, wherein the one or more programs include instructions for:
in response to detecting that the first touch input has entered the second region of the user interface on the touch-sensitive display, undoing the update to the first region of the user interface, made prior to detecting that the first touch input has entered the second region of the user interface on the touch-sensitive display.

42. The electronic device of claim 40, wherein the one or more programs include instructions for:
in response to detecting that the first touch input has entered the second region of the user interface on the touch-sensitive display, ceasing to further update the first region of the user interface in accordance with the first touch input while the first touch input is detected in the second region of the user interface.

* * * * *

UNITED STATES PATENT AND TRADEMARK OFFICE
CERTIFICATE OF CORRECTION

PATENT NO.       : 9,846,535 B2
APPLICATION NO.  : 14/866231
DATED            : December 19, 2017
INVENTOR(S)      : Paine et al.

Page 1 of 1

It is certified that error appears in the above-identified patent and that said Letters Patent is hereby corrected as shown below:

In the Claims

Claim 15, Column 50, Line 43, please delete "region portion of" and insert --region of--.

Signed and Sealed this
Fifth Day of June, 2018

Andrei Iancu
*Director of the United States Patent and Trademark Office*